(12) United States Patent
Ikoshi et al.

(10) Patent No.: US 8,794,753 B2
(45) Date of Patent: Aug. 5, 2014

(54) IMAGE FORMATION METHOD

(71) Applicant: Fujifilm Corporation, Tokyo (JP)

(72) Inventors: Masao Ikoshi, Kanagawa (JP); Shinji Tsuno, Kanagawa (JP); Chiyomi Niitsu, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/018,394

(22) Filed: Sep. 4, 2013

(65) Prior Publication Data
US 2014/0092172 A1 Apr. 3, 2014

(30) Foreign Application Priority Data
Sep. 28, 2012 (JP) ................................. 2012-218425

(51) Int. Cl.
*G01D 11/00* (2006.01)
*B41J 2/14* (2006.01)

(52) U.S. Cl.
CPC ..................................... *B41J 2/1433* (2013.01)
USPC .......................................................... 347/100

(58) Field of Classification Search
USPC ................. 347/95, 96, 100; 106/31.47, 31.49
See application file for complete search history.

(56) References Cited

U.S. PATENT DOCUMENTS

| 8,388,125 B2 * | 3/2013 | Okubo et al. ................. 347/100 |
| 8,651,651 B2 * | 2/2014 | Takaku et al. ................ 347/100 |
| 8,690,307 B2 * | 4/2014 | Okumura et al. ............. 347/100 |

FOREIGN PATENT DOCUMENTS

| JP | 10-60328 A | 3/1998 |
| JP | 2010-126602 A | 6/2010 |

* cited by examiner

*Primary Examiner* — Lamson Nguyen
(74) *Attorney, Agent, or Firm* — SOLARIS Intellectual Property Group, PLLC

(57) ABSTRACT

An image formation method includes an ink ejection process of ejecting, from an inkjet head having a liquid-repellent film on an ejection surface thereof, an ink composition including: an oxidative-treated carbon black pigment having an average primary particle diameter of 25 nm or less and having an amount of oxygen of 5 atomic % or more on a surface thereof; a water-soluble nonionic compound including at least one selected from the group consisting of an ethyleneoxy chain and a propyleneoxy chain and in which a total number of the ethyleneoxy chain and the propyleneoxy chain is from 3 to 25; and water.

9 Claims, 2 Drawing Sheets

IMAGE FORMATION METHOD

CROSS-REFERENCE TO RELATED APPLICATION

This application claims priority under 35 USC 119 from Japanese Patent Application No. 2012-218425, filed on Sep. 28, 2012, the disclosure of which is incorporated by reference herein.

BACKGROUND OF THE INVENTION

1. Technical Field

The present invention relates to an image formation method.

2. Related Art

Inkjet techniques are known as an image recording method for recording a color image. The inkjet techniques have been applied to the fields of office printers, home printers, and the like, and have recently begun to be applied to commercial printing.

Pigment-containing inks (pigment ink) are widely used as ink (ink composition) used in inkjet techniques.

Modification of a surface of a pigment by various methods and controlling physical properties of pigments have been tried in pigment inks. For example, it is disclosed that, in aqueous pigment ink including, as main components, carbon black, a polymer dispersing agent, a water-soluble solvent, and water, by adjusting the content of volatile components in carbon black to from 9 to 25% by weight, a long-term storage stability of the aqueous pigment ink under high temperature is improved, and feathering is prevented to improve print quality when the aqueous pigment ink is used as ink for inkjet recording. (for example, Japanese Patent Application Laid-Open (JP-A) No. H10-60328).

Various image formation methods have been investigated in order to stabilize ejection properties of ink when ejecting inkjet ink from an inkjet head. For example, it is known that a water-repellent film is provided on a surface of the inkjet head in order to improve ejection properties of the ink. However, there is a case in which a water-repellent film may sometimes be deteriorated and ejection stability of the ink cannot be maintained, depending on a usage condition of ink.

In contrast, in order to obtain excellent print density without reducing the water repellency of a surface of the ink ejection hole even when an inkjet recording apparatus equipped with a recording head having a water-repellent film including a fluororesin on a surface of the ink ejection hole is used for printing, (1) an aqueous ink for inkjet recording including cross-linked polymer particles containing channel black with a DBP oil absorption of from 120 to 180 mL/100 g in which the aqueous ink is for an inkjet recording apparatus equipped with a recording head having a water-repellent film including a fluororesin layer on a surface of the ejection hole, and (2) inkjet recording using the aqueous ink thereof are disclosed. (for example, Japanese Patent Application Laid-Open (JP-A) No. 2010-126602).

SUMMARY OF THE INVENTION

The present invention has been made in view of the above circumstances and provides an image formation method.

According to a first aspect of the invention, there is provided an image formation method including an ink ejection process of ejecting, from an inkjet head having a liquid-repellent film on an ejection surface thereof, an ink composition including: an oxidative-treated carbon black pigment having an average primary particle diameter of 25 nm or less and having an amount of oxygen of 5 atomic % or more on a surface thereof; a water-soluble nonionic compound including at least one selected from the group consisting of an ethyleneoxy chain and a propyleneoxy chain and in which a total number of the ethyleneoxy chain and the propyleneoxy chain is from 3 to 25; and water.

DETAILED DESCRIPTION OF THE INVENTION

<<Image Formation Method>>

Figure 1:
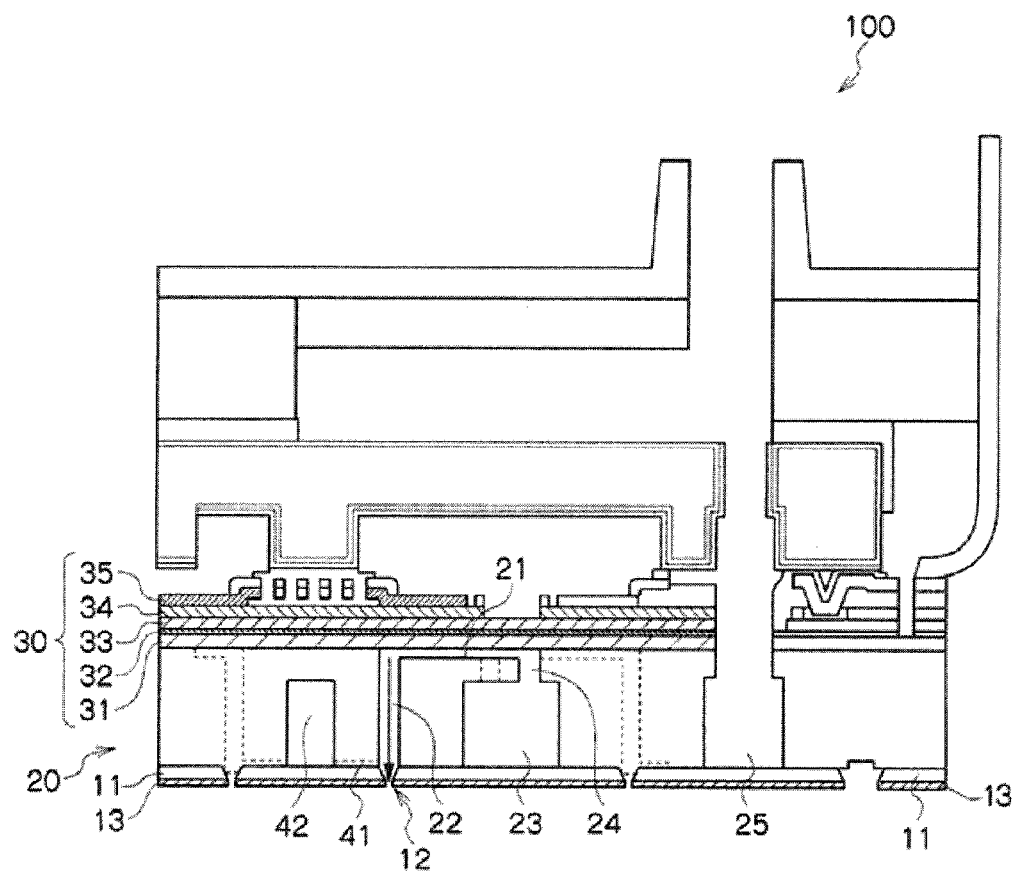
FIG. 1 is a schematic cross-sectional diagram illustrating one example of the internal structure of an inkjet head.

An image formation method of the present invention includes an ink ejection process of ejecting, from an inkjet head having a liquid-repellent film on an ejection surface thereof, an ink composition including: an oxidative-treated carbon black pigment (hereinafter, referred to as a "specific oxidative-treated pigment") having an average primary particle diameter of 25 nm or less and having an amount of oxygen of 5 atomic % or more on a surface thereof; a water-soluble nonionic compound (hereinafter, refer to as a "specific compound") including at least one selected from the group consisting of an ethyleneoxy chain and a propyleneoxy chain and in which a total number of the ethyleneoxy chain and the propyleneoxy chain is from 3 to 25; and water.

The image formation method of the present invention may include an additional process, such as a maintenance process of removing the ink composition, or an ink deposit derived from the ink composition, that is adhered to the liquid-repellent film, if necessary.

In a case in which a carbon black pigment is used as a pigment, when the carbon black pigment is a specific oxidative-treated pigment and the ink composition includes the specific oxidative-treated pigment, a specific compound, and water, degradation of a liquid-repellent film on a surface of inkjet head can be prevented.

JP-A No. 2010-126602 describes that, by using channel black, aggregates are broken down to reduce stress, even when the stress is concentrated on particles in an ink, at the time of wiping treatment operation of the liquid-repellent film of the inkjet head onto which the ink was adhered, whereby the water-repellent film is less likely to be abraded. (JP-A No. 2010-126602, paragraph [0011]).

However, it was found that even when aggregates are broken down to reduce stress, when the carbon black directly contacts a water-repellent film, it is difficult to effectively prevent the water-repellent film from abrasion.

Abradability of a carbon black pigment can be reduced by oxidative treatment of a surface of the carbon black pigment, as compared to a carbon black pigment that is not oxdative-treated. However, when carbon black directly contacts a water-repellent film, there is a case in which the water-repellent film is still damaged to deteriorate.

Further, a surface of a pigment is sometimes coated with a resin in order to obtain good dispersion stability in an ink composition. When a black pigment is coated with a resin, there is a case in which a direct contact of a carbon black pigment to a liquid-repellent film is suppressed by the presence of resin prevents.

However, it is considered that a carbon black pigment is generally present in an ink composition such that primary particles of a carbon black pigment aggregate into secondary particles. It is considered that a resin for coating a pigment is generally adsorbed onto a surface of the secondary particles of a carbon black pigment. When the ink composition ejected from an inkjet head is adhered to an area near an ejection hole of the head under such a condition, secondary particles of the carbon black pigment potentially break up when the ink composition adhered to a liquid-repellent film was removed. It is considered that when the secondary particles break up, primary particles of the carbon black pigment which is not coated with a resin tend to be exposed. It is considered that since the carbon black pigment which is not coated with a resin possesses abradability even when the surface thereof is subjected to oxidative treatment, the liquid-repellent film on the surface of the inkjet head is likely to be abraded.

In contrast, the carbon black pigment included in the ink composition in the invention has an average primary particle diameter of 25 nm or less, that is, abrasion property is low. Since a carbon black pigment in the present invention is oxidative-treated on a surface thereof and have an amount of oxygen of 5 atomic % or more, it is considered that the abradability is suppressed. Further, an ink composition in the present invention contains a specific compound.

The specific compound is a water-soluble nonionic compound including at least one selected from the group consisting of an ethyleneoxy chain and a propyleneoxy chain and in which a total number of the ethyleneoxy chain and the propyleneoxy chain is from 3 to 25. As described above, the specific oxidative-treated pigment is a pigment which is oxidatively treated on a surface thereof, has an amount of oxygen of 5 atomic % or more on a surface thereof, and has oxygen atoms on the surface of the pigment. It is considered that the at least one selected from the group consisting of the ethyleneoxy chain and the propyleneoxy chain which the specific compound has is adsorbed to an oxygen atom of the specific oxidative-treated pigment.

Here, the "ethyleneoxy chain" in the specific compound is represented by "—$CH_2CH_2O$—", and may also be represented by "EO" hereafter. The "propyleneoxy chain" is represented by "—$C_3H_6O$—", and may also be represented by "PO" hereafter.

The term "a total number of the ethyleneoxy chain and the propyleneoxy chain is from 3 to 25" in the specific compound means that the sum, "m+n", of the number of EO, represented by "m" and the number of PO represented by "n" is "$3 \leq m+n \leq 25$".

When the water-soluble nonionic compound includes at least one selected from the group consisting of an ethyleneoxy chain and a propyleneoxy chain at an amount of $3 \leq m+n$, adsorption of the specific oxidative-treated pigment to the specific compound is improved. Further, it is considered that, in the case of $m+n \leq 25$, since the specific compound is a low-molecular compound that moves quickly and freely, the specific compound moves quickly in the ink composition, whereby the specific compound can adsorb to the specific oxidative-treated pigment quickly.

Therefore, it is considered that the specific oxidative-treated pigment in the ink composition is at least covered with the specific compound, whereby the specific oxidative treated pigment is less likely to be exposed.

Also, it is considered that when secondary particles of the specific oxidative-treated pigment coated with a resin are broken up by an external load such as wiping of a liquid-repellent film or the like, the specific compound is immediately adsorbed, whereby the specific oxidative-treated pigment which is not covered with a resin is less likely to be exposed.

As a result, it is considered that when the ink composition in the present invention is ejected from an inkjet head having a liquid-repellent film on an ejection surface thereof, deterioration of the liquid-repellent film due to a carbon black pigment can be prevented.

In recent years, to improve the quality of a print image and increase the efficiency of image formation, image formation has been performed using an inkjet recording apparatus in which an inkjet head is provided with a nozzle plate at which a plurality of ejection holes are two-dimensionally arrayed and a liquid-repellent film is formed on an ejection surface of the nozzle plate.

The nozzle plate has a larger liquid-repellent film-formation area, as compared to a short serial head used in a shuttle system in which the inkjet head is moved in the width direction of a recording medium in a scanning manner to perform recording. Therefore, when a carbon black pigment in an ink composition has abradability, deterioration of a liquid-repellent film is likely to be more severe.

However, when an ink composition is ejected according to the image formation method of the present invention, deterioration of a liquid-repellent film can be prevented even in inkjet recording using a nozzle plate.

Also, in general, in image formation using the nozzle plate described above (particularly, in image formation by a single-pass system), as a result of increasing the rate of image formation, a speed of which recording media onto which an image has been formed are stacked to each other tends to increase. When the speed of which recording media onto which an image has been formed are stacked to each other is increased, an image formed on a recoding medium adheres to other recording medium stacked thereon, and a phenomenon in which the image is damaged tends to occur. This phenomenon is called blocking.

Blocking tends to occur when accuracy of ink ejection is poor (that is, in a case in which unintended overlap of ink dots in an image occurs to locally form an area with a larger amount of ink ejected). Particularly, when an inkjet head in which a liquid-repellent film is deteriorated by maintenance is used, blocking tends to occur since accuracy of ink ejection tends to be decreased.

To the contrary, in the image formation method of the present invention, blocking can be prevented by using an ink composition including a pigment dispersion which can reduce a level of deterioration of a liquid-repellent film by maintenance. (That is, blocking resistance is increased).

Although the reason that blocking can be prevented is not clear, it is assumed that accuracy of ink ejection is improved to prevent unintended overlapping of ink dots by using an ink composition including an oxidative-treated carbon black pigment (specific oxidative-treated pigment) having an average primary particle diameter of 25 nm or less and having an amount of oxygen of 5 atomic % or more on a surface thereof; a water-soluble nonionic compound (specific compound) including at least one selected from the group consisting of an ethyleneoxy chain and a propyleneoxy chain and in which a total number of the ethyleneoxy chain and the propyleneoxy chain is from 3 to 25; and water.

Hereinafter, the image formation method of the present invention is described in detail.

<Ink Ejection Process>

In the present invention, the ink ejection process is a process of ejecting the ink composition according to the present invention from an inkjet head having a liquid-repellent film on an ejection surface thereof.

At first, an inkjet ink composition in the present invention is described in detail.

[Ink Composition]

An ink composition used in the image formation method of the present invention includes an oxidative-treated carbon black pigment having an average primary particle diameter of 25 nm or less and having an amount of oxygen of 5 atomic % or more on a surface thereof; a water-soluble nonionic compound including at least one selected from the group consisting of an ethyleneoxy chain and an propyleneoxy chain and in which a total number of the ethyleneoxy chain and the propyleneoxy chain is from 3 to 25; and water. The ink composition may further include a polymerizable compound, a polymerization initiator, or the like, if necessary. Further, the ink composition is simply referred to as "ink".

(Specific Compound)

The ink composition in the present invention includes at least one type of a water-soluble nonionic compound (specific compound) including at least one selected from the group consisting of an ethyleneoxy chain and a propyleneoxy chain and in which a total number of the ethyleneoxy chain and the propyleneoxy chain is from 3 to 25.

As described above, the term "a total number of the ethyleneoxy chain and the propyleneoxy chain is from 3 to 25" means that the sum, "m+n", of the number of EO represented by "m" and the number of PO represented by "n" is "3≤m+n≤25".

In the present invention, the propyleneoxy chain (PO) may be a linear chain or a branched chain. When the propyleneoxy chain is configured to have plural PO's, a plural PO's may also be the same as or different from each other.

A total number (m+n) of the ethyleneoxy chain and the propyleneoxy chain is preferably from 3 to 22, and more preferably from 3 to 16, from the viewpoint of adsorptivity to the specific oxidative-treated pigment.

In the specific compound, the term "water-soluble" means that the solubility of the specific compound in water at 25° C. is 5% by mass or more.

The specific compound is not particularly limited so far as a total number of EO and PO is from 3 to 25 and the specific compound is soluble in water, and various compounds may be used. For example, the specific compound may be a compound which functions as a surfactant, a polymerizable compound, and the like. Among (meth)acrylic ester compounds and (meth)acrylamide compounds described below, a compound having a total number of EO and PO of from 3 to 25 may be used as the specific compound. When the specific compound that functions as a surfactant is adsorbed to the specific oxidative-treated pigment, the specific compound functions as a lubricant agent for the specific oxidative-treated pigment, whereby abradability of the specific oxidative-treated pigment tends to be reduced.

Among (meth)acrylic ester compounds and (meth)acrylamide compounds described below, examples of (meth)acrylic ester compounds and (meth)acrylamide compounds having a total number of EO and PO of from 3 to 25 include (meth)acrylic ester compound 2, (meth)acrylic ester compounds 4 to 6, polymerizable compound 2, polymerizable compounds 21 to 23, and polymerizable compounds 25 to 31 as a specific example of (meth)acrylamide compound.

Examples of a compound other than the (meth)acrylic ester compounds and the (meth)acrylamide compounds described below include an acetylene glycol-based surfactant having a total number of EO and PO of from 3 to 25, and specific examples thereof include alkylene oxide adducts of 2,4,7,9-tetramethyl-5-decyne-4,7-diol, EO and PO adducts of monooctyl ether, EO and PO adducts of monodecyl ether, EO and PO adducts of monolauryl ether, EO and PO adducts of cecyl ether, EO and PO adducts of glyceryl ether, EO and PO adducts of diglyceryl ether, and EO and PO adducts of alkyl ether having 1 to 4 carbon atoms. Specifically, examples thereof further include PEG (6.5) monodecyl ether.

The specific compound may be a commercially available product.

For example, examples of the commercially available product include Olfine E series such as OLFINE E1010 and OLFINE E1020 from Nisshin Chemical Industry Co., Ltd.

In OLFINE E1010, a total number of EO and PO is 10, whereas in OLFINE E1020, a total number of EO and PO is 20.

The ink composition may include one type of specific compound alone or two types or more of the specific compounds in combination.

The content ratio of the specific compound in the ink composition is not particularly limited, but is preferably from 0.1% by mass to 10% by mass, and more preferably from 0.3% by mass to 3% by mass, with respect to a total mass of the ink composition, from the viewpoint of adsorptivity of the specific compound to the specific oxidative-treated pigment.

(Carbon Black Pigment)

The ink composition includes at least one type of a specific oxidative-treated pigment.

The specific oxidative-treated pigment is an oxidative-treated carbon black pigment having an average primary particle diameter of 25 nm or less and having an amount of oxygen of 5 atomic % or more on a surface thereof.

When a carbon black pigment is the specific oxidative-treated pigment in which an average primary particle diameter is 25 nm or less and a surface thereof is subjected to oxidative treatment to have an amount of oxygen of 5 atomic % or more on a surface thereof, abrasion of the liquid-repellent film provided on the surface of the inkjet head is likely to be prevented.

Hereinafter, an amount of oxygen on the surface may also be referred to as an "amount of surface oxygen".

An average primary particle diameter of the specific oxidative-treated pigment is calculated as an arithmetic mean of particle diameters determined by averaging out the particle diameter (circle equivalent diameter) of 1,000 primary particles that is randomly selected from a captured image using a transmission electron microscope TEM 2010 (accelerating voltage: 200 kV), manufactured by JEOL Ltd.

The average primary particle diameter of the specific oxidative-treated pigment is preferably 25 nm or less, and more preferably 20 nm or less. The average primary particle diameter of the specific oxidative-treated pigment is preferably 12 nm or more. When the primary particle diameter of the specific oxidative-treated pigment is 12 nm or more, dispersion suitability of the pigment tends to be maintained.

In the specific oxidative-treated pigment, the term "an amount of oxygen of 5 atomic % or more on the surface" means that a ratio of the number of oxygen atoms (O) to the number of carbon atoms (C) (ratio of the number of atoms: (O/C)×100%) existing on a surface of the carbon black pigment particles (including a detectable interior portion of the particle by X-ray photoelectron spectroscopy. Generally, a detectable depth of analysis by X-ray photoelectron spectroscopy is from 3 to 5 nm). In the present invention, the amount of oxygen is determined on the basis of the carbon atom using an X-ray photoelectron spectroscopy (XPS) or ESCA (also referred to as electron spectroscopy for chemical analysis).

The amount of oxygen on the surface of a specific oxidative-treated pigment is preferably 7 atomic % or more, and more preferably 10 atomic % or more. The amount of oxygen is preferably 15 atomic % or less, and more preferably 13 atomic % or less, from the viewpoint of dispersion suitability of a specific oxidative-treated pigment.

The method of oxidative treatment of a carbon black pigment may be contacting a carbon black pigment having an amount of oxygen of less than 5 atomic % to an oxidizing agent. The carbon black pigment having an amount of oxygen of less than 5 atomic % includes an untreated carbon black pigment having an amount of oxygen O atomic % and of which the surface is not subjected to oxidative treatment.

Examples of the oxidizing agent include ozone, hydrogen peroxide, nitric acids, and hypochlorous acids, and ozone with little residual impurities and nitric acids are preferred. When a carbon black pigment having an amount of oxygen of less than 5 atomic % is oxidized with ozone, it is enough that the carbon black pigment having the amount of oxygen less than 5 atomic % contacts an ozone-containing gas at ambient temperature.

There is also a method of wet oxidation of a carbon black pigment having an amount of oxygen of less than 5 atomic % using a hypohalous acid salt. Specific examples of the hypohalous acid salt include sodium hypochlorite and potassium hypochlorite, and sodium hypochlorite is particularly preferred in terms of reactivity.

Examples of a carbon black having an amount of oxygen of less than 5 atomic % include carbon black manufactured by a known method such as a contact method, furnace method, or a thermal method.

Specific examples thereof include Raven 7000, Raven 5750, Raven 5250, Raven 5000 ULTRAII, Raven 3500, Raven 2000, Raven 1500, Raven 1250, Raven 1200, Raven 1190 ULTRAII, Raven 1170, Raven 1255, Raven 1080, Raven 1060, and Raven 700 (all manufactured by Columbian Chemicals Company), Regal 400R, Regal 330R, Regal 660R, Mogul L, Black Pearls L, Monarch 700, Monarch 800, Monarch 880, Monarch 900, Monarch 1000, Monarch 1100, Monarch 1300, and Monarch 1400 (all manufactured by Cabot Corporation), Color Black FW1, Color Black FW2, Color Black FW2V, Color Black 18, Color Black S150, Color Black S160, Color Black S170, Printex 35, Printex U, Printex V, Printex 140U, Printex 140V, NIPEX 180-IQ, NIPEX 170-IQ (all manufactured by Evonik Degussa Corporation), No. 25, No. 33, No. 40, No. 45, No. 47, No. 52, No. 900, No. 2200B, No. 2300, No. 990, No. 980, No. 970, No. 960, No. 950, No. 850, MCF-88, MA600, MA 7, MA 8, and MA 100 (all manufactured by Mitsubishi Chemical Corporation). However, the carbon black is not limited to these.

One type of the carbon black pigment having an amount of oxygen of less than 5 atomic % may be used alone or in combination of two types or more thereof.

A pH of the specific oxidative-treated pigment is preferably in a range of from around acid to around neutral, more preferably from pH 2.0 to pH 8.5, and particularly preferably from pH 2.5 to pH 8.0, from the viewpoint of dispersibility.

The pH of the specific oxidative-treated pigment is determined as a pH (25° C.) of an aqueous dispersion of the specific oxidative-treated pigment.

A DBP absorption value of the specific oxidative-treated pigment is not particularly limited, but is preferably from 30 mL/100 g to 200 mL/100 g, and more preferably from 50 mL/100 g to 150 mL/100 g, from the viewpoint of color hue and print image density.

The DBP absorption value is determined according to JIS K6621 A method.

A BET specific surface area of the specific oxidative-treated pigment is not particularly limited, but is preferably from 30 $m^2/g$ to 450 $m^2/g$, and more preferably from 200 $m^2/g$ to 400 $m^2/g$, from the viewpoints of print image density and storage stability.

The specific oxidative-treated pigment may be a commercially available product.

Specific examples thereof include Special Black 6 (amount of surface oxygen: 11 atomic %, Orion Engineered Carbons Co., Ltd), Colour Black FW 200 (amount of surface oxygen: 12 atomic %, Orion Engineered Carbons Co., Ltd), Fuji Jet Black (amount of surface oxygen: 12 atomic %, manufactured by Fuji Pigment Co., Ltd.), and Colour Black FW 182 (amount of surface oxygen: 12 atomic %, Orion Engineered Carbons Co., Ltd).

Further, a commercially available product having an amount of oxygen of less than 5 atomic % on a surface thereof, such as Nipex 160 (amount of surface oxygen: 2 atomic %, Orion Engineered Carbons Co., Ltd) and Nipex 170 (amount of surface oxygen: 3 atomic %, Orion Engineered Carbons Co., Ltd) is further oxidative-treated to obtain a carbon black pigment having an amount of surface oxygen of 5 atomic % or more and used as the specific oxidative-treated pigment.

The ink composition may include one type of the specific oxidative-treated pigment alone or two types or more in combination.

The content ratio of the specific oxidative-treated pigment in the ink composition is not particularly limited, but is preferably from 0.5% by mass to 4% by mass, and more preferably from 0.8% by mass to 2% by mass, with respect to the total mass of the ink composition, from the viewpoints of prevention of deterioration of a liquid-repellent film, rubbing resistance of an image, and print image density.

—Color Pigment—

The ink composition may include at least one pigment selected from the group consisting of a magenta pigment, a cyan pigment, and a yellow pigment, in addition to the specific oxidative-treated pigment.

Examples of the magenta pigment include C.I. Pigment Red 122, C.I. Pigment Red 202, C.I. Pigment Red 209, and C.I. Pigment Violet 19.

Examples of the cyan pigment include C.I. Pigment Blue 15:3, C.I. Pigment Blue 15:4, and C.I. Pigment Blue 16.

Examples of the yellow pigment include C.I. Pigment Yellow 74, C.I. Pigment Yellow 155, and C.I. Pigment Yellow 185.

In the present invention, the content ratio of a color pigment to a total amount of the specific oxidative-treated pigment and the color pigment (color pigment/(specific oxidative-treated pigment+color pigment)) is not particularly limited, but is preferably from 5% by mass to 60% by mass, and more preferably from 10% by mass to 50% by mass, from the viewpoints of rubbing resistance of an image and ejection properties of ink.

(Dispersing Agent)

The specific oxidative-treated pigment (when a color pigment is further included, both the specific oxidative-treated pigment and the color pigment are hereinafter referred to as a "pigment") is preferably dispersed in an aqueous medium with a dispersing agent. The dispersing agent may be a polymeric dispersing agent or a low molecular weight surfactant-type dispersing agent. Further, the polymeric dispersing agent may be a water-soluble dispersing agent or a water-insoluble dispersing agent.

As the low molecular weight surfactant-type dispersing agent, a low molecular weight surfactant commonly used can be used without particular limitation.

Among polymeric dispersing agents, examples of a water-soluble dispersing agent include a hydrophilic polymer compound. Examples of a natural hydrophilic polymer compound include a plant-base polymer such as gum arabic, gum tragacanth, guar gum, gum karaya, locust bean gum, arabinogalactone, pectin, and quince seed starch; a seaweed-based polymer such as alginic acid, carrageenan, and agar; an animal-based polymer such as gelatin, casein, albumin, and collagen; and a microorganism-based polymer such as xanthan gum and dextran.

Examples of a hydrophilic polymer compound in which a natural product as a raw material is modified include a cellulose based polymer such as methylcellulose, ethylcellulose, hydroxyethylcellulose, hydroxypropylcellulose, and carboxymethyl cellulose, a starch-based polymer such as sodium starch glycolate and sodium starch phosphate, and a seaweed-based polymer such as sodium alginate and propylene glycol alginate ester.

Further, examples of a synthetic hydrophilic polymer compound include a vinyl-based polymer such as polyvinyl alcohol, polyvinyl pyrrolidone, and polyvinyl methyl ether; an acrylic-based resin such as non-crosslinked polyacrylamide, polyacrylic acid and an alkali metal salt thereof, and a water-soluble styrene-acrylic resin; a water-soluble styrene-maleic acid resin; a water-soluble vinylnapthalene-acrylic resin; a water-soluble vinylnaphthalene-maleic aid resin; polyvinyl pyrrolidone, polyvinyl alcohol; a polymer compound having, in a side chain thereof, a salt of a cationic functional group such as an alkali metal salt of a β-naphthalenesulfonic acid-formaldehyde condensate, a quaternary ammonium salt or an amino group; and a natural polymer compound such as shellac.

Among them, a water-soluble dispersing agent in which a carboxyl group is introduced, such as a homopolymer of acrylic acid, methacrylic acid, a styrene-acrylic acid, or the like; a copolymer with other monomer having a hydrophilic group, or the like is preferred as the hydrophilic polymer compound.

Among the polymeric dispersing agents, a water-insoluble resin having a hydrophobic structural unit and a hydrophilic structural unit can be used as the water-insoluble dispersing agent. As the hydrophilic structural unit, a structural unit having an acidic group is preferred, and a structural unit having a carboxylic group is more preferred.

Examples of the water-insoluble resin include a styrene-(meth)acrylic acid copolymer, a styrene-(meth)acrylic acid-(meth)acrylic acid ester copolymer, a (meth)acrylate ester-(meth)acrylic acid copolymer, a polyethylene glycol (meth)acrylate-(meth)acrylic acid copolymer, a vinyl acetate-maleic acid copolymer, and a styrene-maleic acid copolymer.

More specifically, for example, a water-insoluble resin described in JP-A No. 2005-41994, JP-A No. 2006-273891, JP-A No. 2009-084494 and JP-A No. 2009-191134 can be preferably used in the present invention.

In the present invention, "(meth)acrylic acid" represents acrylic acid or methacrylic acid, and "(meth)acrylic acid ester" ("(meth)acrylate") represents an acrylic acid ester (acrylate) or a methacrylic acid ester (methacrylate).

The weight average molecular weight of the polymeric dispersing agent is preferably from 3,000 to 100,000, more preferably from 5,000 to 50,000, further preferably from 5,000 to 40,000, and particularly preferable from 10,000 to 40,000.

From the viewpoints of self-dispersibility and the coagulation rate when contacting a treatment liquid described below, the polymeric dispersing agent preferably include a water-insoluble resin having a carboxyl group, preferably include a water-insoluble resin having a carboxyl group and an acid value of 100 mg KOH/g or less, and more preferably includes a water-insoluble resin having an acid value of from 25 to 100 mg KOH/g. In particular, when the ink composition is used in combination with a treatment liquid (a detail is described below) which agglutinates components in the ink composition, a polymeric dispersing agent having a carboxyl group and an acid value of from 25 to 100 mg KOH/g is effective.

The mixing mass ratio (p:s) of a pigment (p) to a dispersing agent (s) is preferably in a range of from 1:0.06 to 1:3, more preferably in a range of from 1:0.125 to 1:1, and further preferably from 1:0.125 to 1:0.7.

In the present invention, from the viewpoints of light fastness and quality of an image, coloring particles are preferably formed from a pigment and a dispersing agent, and more preferably the coloring particles include a pigment and a water-insoluble resin having an acidic group, and particularly preferably the coloring particles include a pigment and a water-insoluble resin having a carboxyl group.

Also, from the viewpoint of coagulation properties, the specific oxidative-treated pigment and the at least one of color pigments is preferably a resin-coated pigment in which a pigment is coated with a water-insoluble resin (polymeric dispersing agent) having an acidic group. The water-insoluble resin means the resin having an amount of dissolution of 10 g or less in 100 g of water at 25° C. after the resin was dried at 105° C. for 2 hours, and the amount of dissolution is preferably 5 g or less, and more preferably 1 g or less. An amount of dissolution is the amount of dissolution of the resin when the resin was 100% neutralized with sodium hydroxide or acetic acid depending on the type of the salt forming group of the water-insoluble resin.

Specifically, the resin-coated pigment may be manufactured by a method including, for example, (i) a process of mixing and a dispersing a pigment, a water-soluble resin (dispersing agent), an aqueous solution containing a basic substance, and an organic solvent which can dissolve or disperse the water-soluble resin (mixture and hydration process); and (ii) a process of removing at least a part of the organic solvent (solvent removal process).

A cross-linked resin-coated pigment can be manufactured, for example, by a method further including, between process (i) and process (ii), (iii) a process of adding a cross-linking agent to the dispersion obtained in the dispersion treatment and then heating to cross-link the water-soluble resin (cross-linking process); and (iv) a process of purifying the dispersion after cross-linked to remove impurities (purification process).

By process (i) to process (iv), the pigment is finely dispersed, whereby a pigment dispersion with excellent storage stability can be manufactured.

Specifically, a pigment dispersion in which at least a part of a surface of the pigment is coated with a water-insoluble resin can be manufactured by the method described in, for example, JP-A No. 2009-190379.

An average particle diameter of the coloring particles in a dispersion state is preferably from 10 to 200 nm, more preferably from 10 to 150 nm, and further preferably from 40 to 150 nm. When an average particle diameter is 200 nm or less, color reproducibility is good and ejection property at the time of ejecting by an inkjet recording method is good, and when an average particle diameter is 10 nm or more, light fastness is good. Further, there is no particular limitation on the particle size distribution of the coloring particles, and the particle size distribution may be either a wide distribution or mono-dispersed distribution. Two types or more of the coloring particles having a mono-dispersed particle size distribution may be mixed and used.

Here, the average particle diameter of the coloring particles in a dispersion state represents an average particle diameter of the coloring particles in a state of the formed ink, but is applied to the so-called concentrated ink dispersion at a stage prior to forming ink.

An average particle diameter and a particle size distribution of the coloring particles in the dispersion state is determined by calculating the volume average particle diameter by the dynamic light scattering method using a NANOTRACK particle size distribution measurement apparatus UPA-EX150 (manufactured by NIKKISO Co., Ltd.).

The pigment coated with a water-insoluble resin having an acidic group (preferably a carboxyl group) can be obtained, for example, by a dispersion treatment of a mixture including the pigment, and the water-insoluble resin (dispersing agent), and if necessary, a solvent (preferably organic solvent), using a dispersion machine.

Specifically, a pigment dispersion in which at least a part of a surface of the pigment is coated with a water-insoluble resin can be manufactured, for example, by a manufacturing method including: a process of adding an aqueous solution containing a basic substance to a mixture of a pigment, a water-insoluble resin (dispersing agent), and an organic solvent which can dissolve or disperse the water-insoluble resin to perform dispersing treatment (mixture and hydration process); and a process of removing at least a part of the organic solvent (solvent removal process). By this method, the pigment is finely dispersed, whereby a pigment dispersion with excellent storage stability can be prepared.

More specifically, the pigment dispersion in which at least a part of the surface of the pigment is coated with a water-insoluble resin can be manufactured, for example, by a manufacture method of the pigment dispersion described in JP-A No. H10-140065.

Alternatively, a method of producing a pigment dispersion by insolubilization of a water-soluble dispersing agent by cross-linking the dispersing agent using a cross-linking agent after the pigment is dispersed using a water-soluble or water-insoluble dispersing agent is also preferred as the method of obtaining a "pigment dispersion in which at least a part of a surface of a pigment is coated with a water-insoluble resin". This method is also preferred from the viewpoint of reducing abrasion of a liquid-repellent film since a surface of the secondary particles of the pigment is firmly coated with the resin of dispersing agent through cross-linking Examples of the dispersing agent include polyvinyl, polyurethanes, and polyesters, but among them, polyvinyl is preferred.

The dispersing agent necessarily has, in a molecule thereof, a functional group that is cross-linkable with a cross-linking agent. The cross-linkable functional group is not particularly limited and examples thereof include a carboxyl group or salts thereof, an isocyanate group, and an epoxy group, but the dispersing agent preferably has a carboxyl group or salts thereof from the viewpoint of improving dispersibility.

As the dispersing agent, a copolymer obtained using a carboxyl group-containing monomer as a copolymerization component is preferred. Examples of the carboxyl group-containing monomer include (meth)acrylic acid, β-carboxyethyl acrylate, fumaric acid, itaconic acid, maleic acid, and crotonic acid, and among them, (meth)acrylic acid and β-carboxylethyl acrylate are preferred from the viewpoints of cross-linking property and dispersion stability. Here, (meth)acrylic acid means at least either one of acrylic acid and methacrylic acid.

The copolymerization component preferably contains at least one type of hydrophobic monomer. Examples of the hydrophobic monomer include an alkyl (meth)acrylate having from 1 to 20 carbon atoms, a (meth)acrylate having an aromatic ring group such as benzyl (meth)acrylate or phenoxyethyl (meth)acrylate, and styrene and a derivative thereof.

The dispersing agent is preferably a copolymer obtained using, as a copolymerization component, a carboxyl group-containing monomer and at least one of an alkyl (meth)acrylate having from 1 to 20 carbon atoms and a (meth)acrylate having an aromatic ring group.

A synthetic method of the copolymer as the dispersing agent is not particularly limited, but a random polymerization of vinyl monomers is preferred in terms of dispersion stability.

The acid value of the dispersing agent before cross-linking is preferably from 60 to 250 mg KOH/g, and more preferably from 65 to 150 mg KOH/g from the viewpoint of dispersibility of a pigment.

The acid value of the dispersing agent after cross-linking is preferably from 25 to 100 mg KOH/g from the viewpoints of stability and coagulation properties of ink.

The weight average molecular weight of the dispersing agent before cross-linking is not particularly limited, but preferably from 3,000 to 100,000, more preferably from 5,000 to 60,000, and further preferably from 10,000 to 50,000, from the viewpoint of dispersibility of a pigment.

The cross-linking agent is not particularly limited so far as the cross-linking agent is a compound having two or more sites that react with a dispersing agent, but preferably a compound having two or more epoxy groups (two or more functional-epoxy compound) since the compound having two or more epoxy groups has excellent reactivity with a carboxyl group.

Specific examples thereof include ethylene glycol diglycidyl ether, polyethylene glycol diglycidyl ether, 1,6-hexanediol diglycidyl ether, diethylene glycol diglycidyl ether, polyethylene glycol diglycidyl ether, dipropylene glycol diglycidyl ether, polypropylene glycol diglycidyl ether, and trimethylolpropane triglycidyl ether, and polyethylene glycol diglycidyl ether, diethylene glycol diglycidyl ether, and trimethylolpropane triglycidyl ether are preferred.

As the cross-linking agent, a commercially available product may be used.

Examples of the commercially available product that may be used include Denacol EX-321, EX-821, EX-830, EX-850, and EX-851 (all are manufactured by Nagase ChemteX Corporation).

A mole ratio of a cross-linking site of the cross-linking agent and a site of the dispersing agent which is cross-linkable with the cross-linking site of the crosslinking agent is preferably from 1:1.1 to 1:10, more preferably from 1:1.1 to 1:5, and most preferably from 1:1.1 to 1:3, from the viewpoints of cross-linking speed and stability of the dispersion liquid after cross-linking In the present invention, at least the specific oxidative-treated pigment is used as the pigment, and if necessary, at least one color pigment is used. When the ink composition further includes a color pigment, the specific oxidative-treated pigment and the color pigment may be subjected to dispersion treatment in a mixture state or each of the specific oxidative-treated pigment and the color pigment is subjected to dispersion treatment separately.

(Water)

The ink composition in the present invention includes water.

As the water in the present invention, water which does not contain ionic impurities such as ion-exchanged water and distilled water is preferably used.

The content of water in the ink composition is appropriately selected depending on the purpose, but preferably from 10% by mass to 99% by mass, more preferably from 30% by mass to 80% by mass, and further preferably from 50% by mass to 70% by mass, with respect to a total mass of the ink composition, from the viewpoints of stability of the ink composition and retention of ejection-reliability.

(Polymerizable Compound)

The ink composition preferably includes at least one type of polymerizable compound, from the viewpoint of improving rubbing resistance of an image obtained in image formation.

When the ink composition includes a polymerizable compound, the ink composition is polymerized and cured by irradiation with an activation energy ray (for example, radiation, light or electron beam).

Also, since the ink composition used in the image formation method of the present invention includes water as a solvent, the polymerizable compound is preferably water-soluble.

Here, the term "a polymerizable compound is water-soluble" means that the solubility of the polymerizable compound in water at 25° C. is 5% by mass or more, and the solubility of the polymerizable compound in water at 25° C. is preferably 10% by mass or more. It is preferable that the polymerizable compound can also be dissolved in an aqueous ink composition (preferably, uniformly). The polymerizable compound may be the compound, in which the solubility thereof is increased by adding a water-soluble organic solvent described below so that the compound can be dissolved in the ink composition (preferably, uniformly).

The polymerizable compound preferably includes at least one selected from the group consisting of (meth)acrylic ester compounds and (meth)acrylamide compounds, and more preferably includes at least one (meth)acrylamide compound.

—(Meth)acrylic Ester Compound—

The (meth)acrylic ester compound is not particularly limited so far as the (meth)acrylic ester compound is the polymerizable compound that is water-soluble and has a (meth)acrylic ester group in a molecule thereof.

The (meth)acrylic ester compound is preferably the compound represented by the following Formula (M-1).

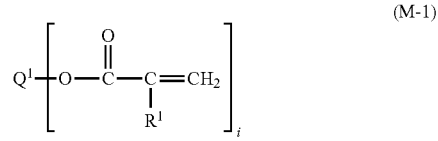

(M-1)

In Formula (M-1), $Q^1$ represents an i-valent linking group and $R^1$ represents a hydrogen atom or a methyl group. i represents an integer of 1 or more.

In the compound represented by Formula (M-1), the group parenthesized with "[ ]$_i$" represents the (meth)acrylic ester group. That is, the compound represented by Formula (M-1) has the number of "i" of (meth)acrylic ester groups in a molecule thereof.

The compound represented by Formula (M-1) is the compound in which an unsaturated monomer is linked through an ester bond with the linking group $Q^1$. $R^1$ represents a hydrogen atom or a methyl group, and preferably a hydrogen atom. Valency i of the linking group $Q^1$ is not particularly limited, but preferably 2 or more, more preferably from 2 to 6, and further preferably from 2 to 4.

The linking group $Q^1$ is not particularly limited so far as the linking group is the group that can be linked to a (meth)acrylic ester group, but preferably selected from the linking group such that the compound represented by Formula (M-1) enables to satisfy the solubility as described above. Specific examples thereof include a residue obtained by removing one or more hydrogen atom or hydroxyl group from the following Compound Group X.

—Compound Group X—

Polyols such as ethylene glycol, diethylene glycol, triethylene glycol, polyethylene glycol, propylene glycol, dipropylene glycol, tripropylene glycol, polypropylene glycol, 1,3-propandiol, 1,2-butanediol, 1,3-butanediol, 1,4-butanediol, 2,3-butanediol, 1,5-pentanediol, 1,4-pentanediol, 2,4-pentanediol, 3-methyl-1,5-pentanediol, 2-methyl-2,4-pentanediol, 1,5-hexanediol, 1,6-hexanediol, 2,5-hexanediol, glycerine, 1,2,4-butanetriol, 1,2,6-hexanetriol, 1,2,5-pentanetriol, thioglycol, trimethylolpropane, ditrimethylolpropane, trimethylolethane, ditrimethylolethane, neopentyl glycol, pentaerythritol, dipentaerythritol, and a condensate thereof, low molecular weight polyvinyl alcohol, and saccharides; and polyamines such as ethylenediamine, diethylenetriamine, triethylenetetramine, polyethyleneimine, and polypropylenediamine.

Examples of the linking group $Q^1$ further include a substituted or unsubstituted alkylene chain having 4 carbon atoms or less such as methylene, ethylene, propylene, or butylene; and a functional group having a saturated or unsaturated heterocyclic ring such as a pyridine ring, an imidazole ring, a pyrazine ring, a piperidine ring, a piperazine ring, or a morpholine ring.

Among them, as the linking group $Q^1$, a residue of polyols containing an oxyalkylene group (preferably the oxyethylene group) is preferred, and a residue of polyols containing 3 or more of oxyalkylene groups (preferably an oxyethylene group) is particularly preferred.

Specific examples of the water-soluble (meth)acrylic ester compound include the following (Meth)acrylic Ester Compounds 1 to 6, but the present patent application is not limited to these.

(Meth)acrylic Ester Compound 1

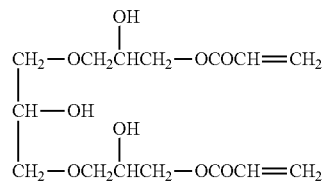

(Meth)acrylic Ester Compound 2

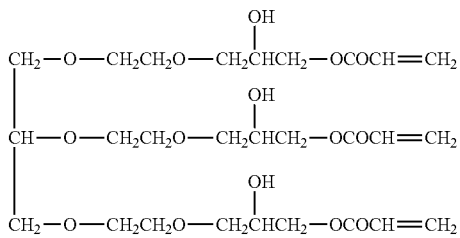

(Meth)acrylic Ester Compound 3

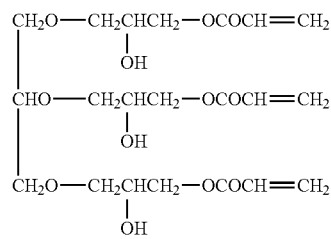

(Meth)acrylic Ester Compound 4

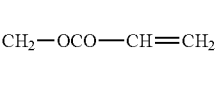

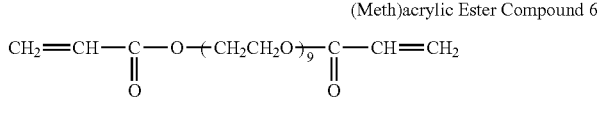

(Meth)acrylic Ester Compound 5

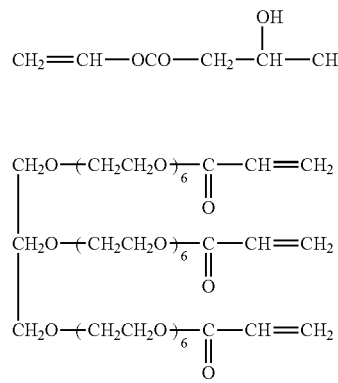

(Meth)acrylic Ester Compound 6

As the (meth)acrylic ester compound, a (meth)acrylic acid ester having, in a molecule thereof, 2 or more of acryloyl groups derived from a polyol compound can also be used. Examples of the polyol compound include a condensate of glycols, oligoethers, oligoesters, and a polyol compound having 2 or more hydroxyl groups such as monosaccharides and disaccharides.

A (meth)acrylic acid ester with triethanolamine, diethanolamine, tris(hydroxyamino)methane, and tris(hydroxyamino)ethane is also suitable.

Further, specific examples of the water-soluble (meth) acrylic ester compound (M-1) include the following cationic compounds, but the present invention is not limited to these.

Structure 1

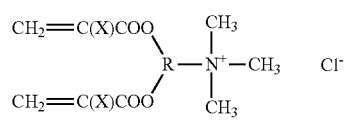

Structure 2

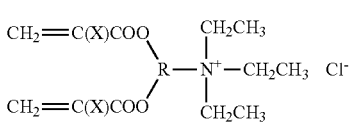

-continued

Structure 3

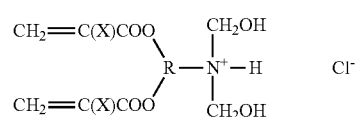

Structure 4

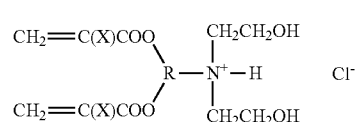

Structure 5

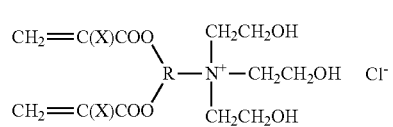

Structure 6

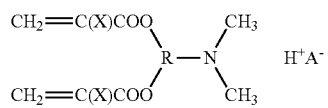

Structure 7

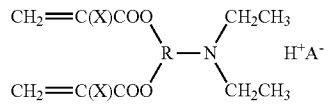

-continued

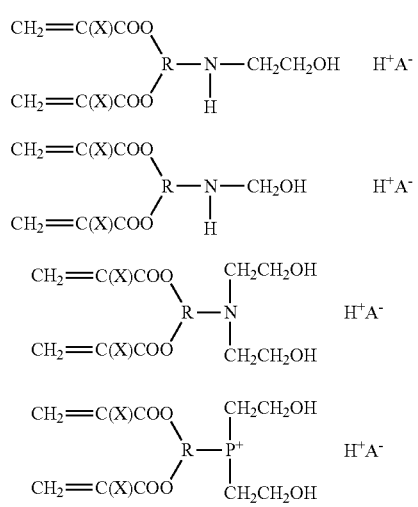

Structure 8

Structure 9

Structure 10

Structure 11

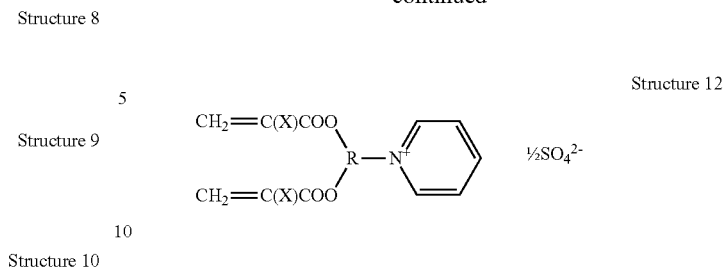

Structure 12

In the structures, R represents a residue of a polyol compound. X represents H or $CH_3$ and $A^-$ represents $Cl^-$, $HSO_4^-$, or $CH_3COO^-$. Examples of the polyol compound include glycerin, 1,2,4-butanetriol, 1,2,5-pentanetriol, 1,2,6-hexanetriol, trimethylolpropane, trimethylolmethane, pentaerythritol, bisphenol A, alicyclic-type bisphenol A, and a condensate thereof. Further, examples of a polymerizable compound having a cationic group include the following structures (Cationic Compounds 1 to 11).

Cationic Compound 1

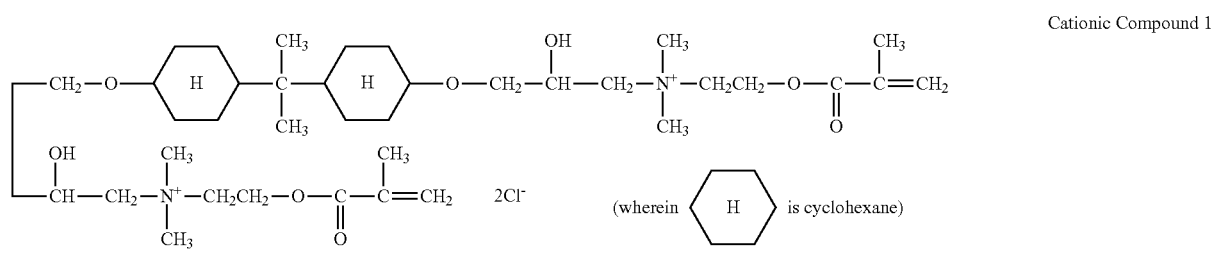

(wherein ⬡H is cyclohexane)

Cationic Compound 2

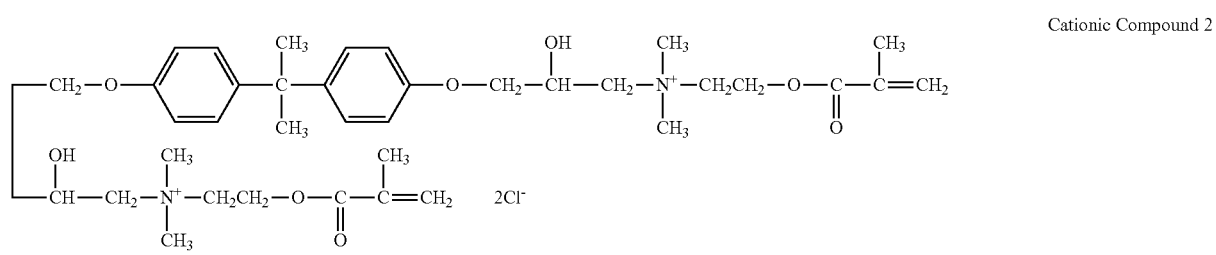

Cationic Compound 3

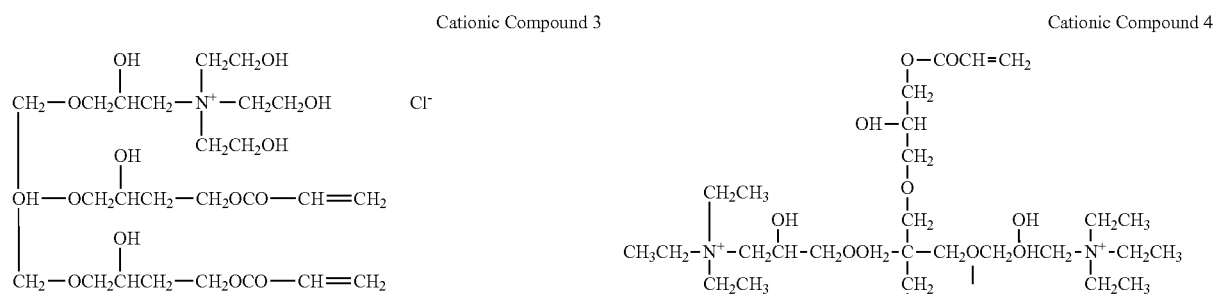

Cationic Compound 4

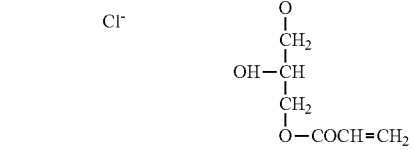

-continued

Cationic Compound 5

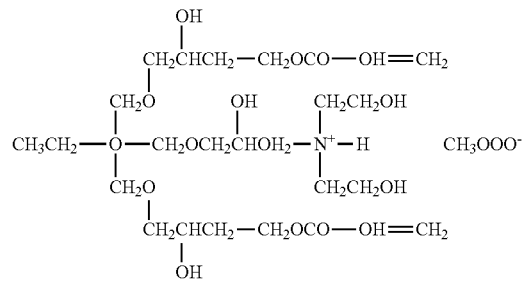

Cationic Compound 6

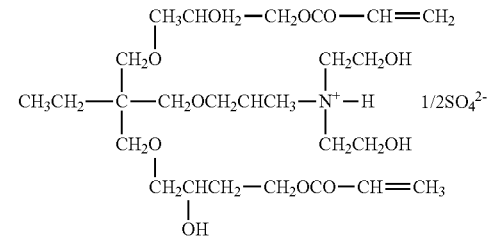

Cationic Compound 7

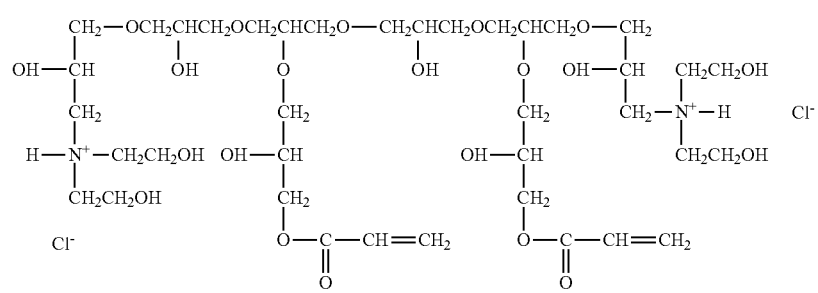

Cationic Compound 8

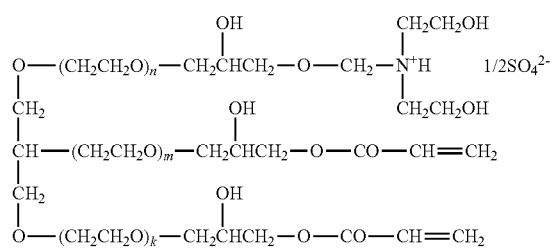

Cationic Compound 9

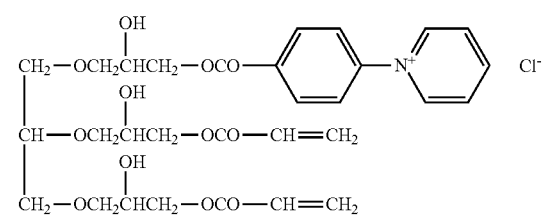

Cationic Compound 10

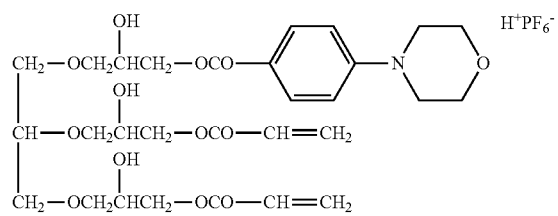

Cationic Compound 11

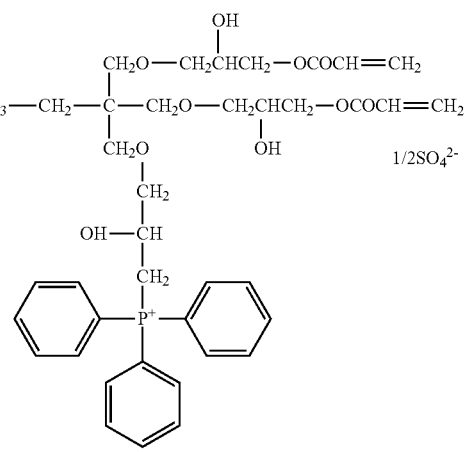

—(Meth)acrylamide Compound—

The (meth)acrylamide compound is not limited so far as the (meth)acrylamide compound is a polymerizable compound having a (meth)acrylamide group in a molecule thereof.

The (meth)acrylamide compound is preferably a compound represented by the following Formula (M-2). When the (meth)acrylamide compound has a structure represented by Formula (M-2), compatibility of the compound represented by the following Formula (1) with a polymerizable compound is improved, whereby curing sensitivity can be increased, thus, it is preferable.

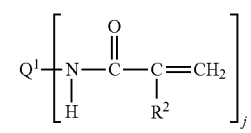

In Formula (M-2), $Q^2$ represents a j-valent linking group and $R^2$ represents a hydrogen atom or a methyl group. Also, j represents an integer of 1 or more.

In the compound represented by Formula (M-2), the group parenthesized with "[ ]$_j$" represents the (meth)acrylamide group. That is, the compound represented by Formula (M-2) has the number of "j" of (meth)acrylamide group in a molecule thereof.

The compound represented by Formula (M-2) is the compound in which an unsaturated monomer is linked through an amide bond with the linking group $Q^2$. $R^2$ represents a hydrogen atom or a methyl group, and preferably a hydrogen atom. Valency j of the linking group $Q^2$ is not particularly limited, but preferably 2 or more, more preferably from 2 to 6, and further preferably from 2 to 4.

The linking group $Q^2$ is not particularly limited so far as the linking group is the group that can link with the (meth)acrylamide group. A detail of the linking group $Q^2$ is the same as the linking group $Q^1$ described above, and a preferred embodiment is also the same.

Specific examples of the water-soluble (meth)acrylamide compound include the following Polymerizable Compounds 1-32.

Polymerizable Compound 1

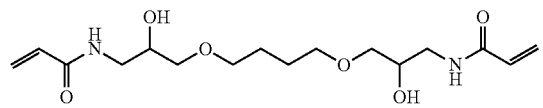

Polymerizable Compound 2

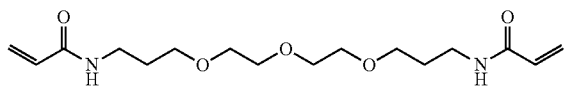

Polymerizable Compound 3

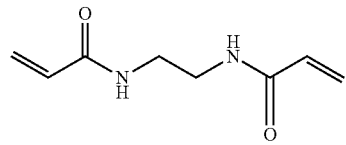

Polymerizable Compound 4

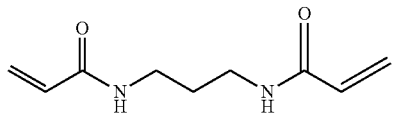

Polymerizable Compound 5

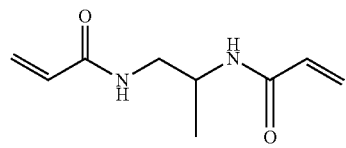

Polymerizable Compound 6

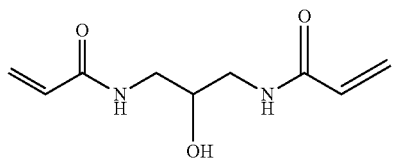

Polymerizable Compound 7

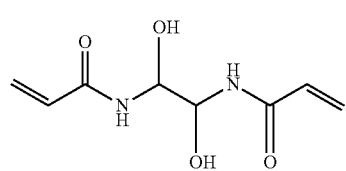

Polymerizable Compound 8

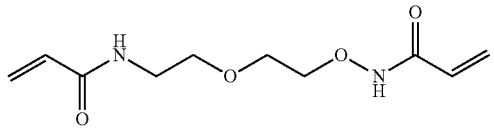

Polymerizable Compound 9

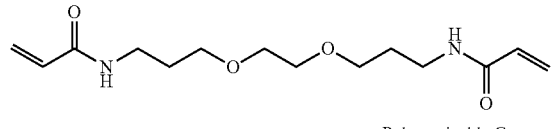

Polymerizable Compound 10

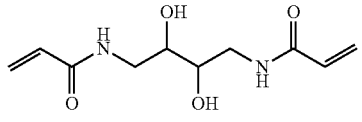

Polymerizable Compound 11

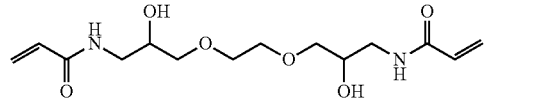

Polymerizable Compound 12

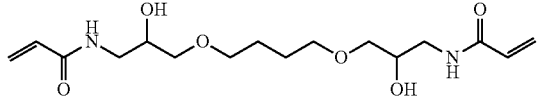

Polymerizable Compound 13

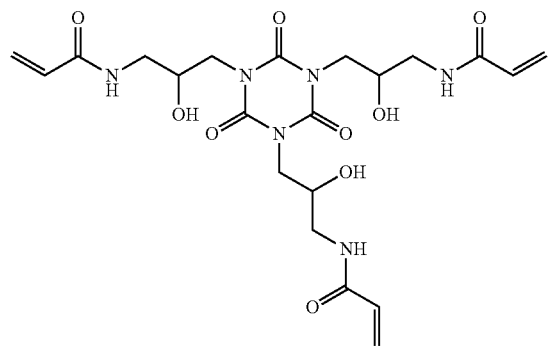

Polymerizable Compound 14

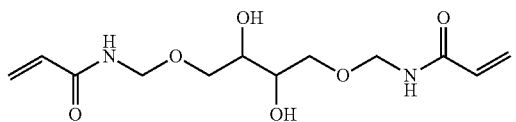

-continued
Polymerizable Compound 15
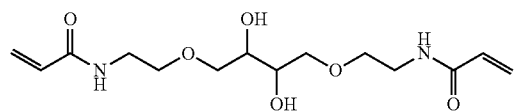
Polymerizable Compound 16
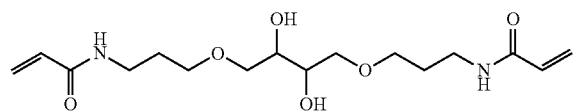
Polymerizable Compound 17
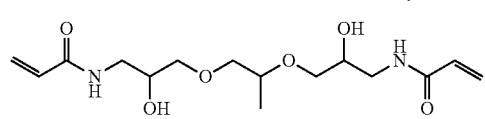
Polymerizable Compound 18
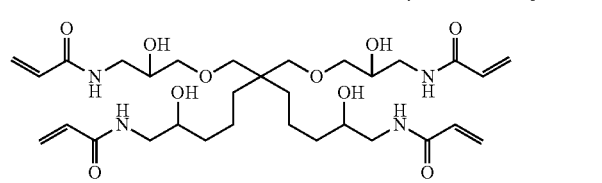
Polymerizable Compound 19
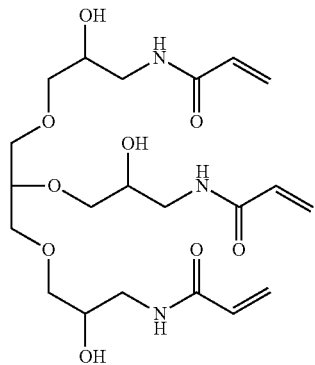
Polymerizable Compound 20
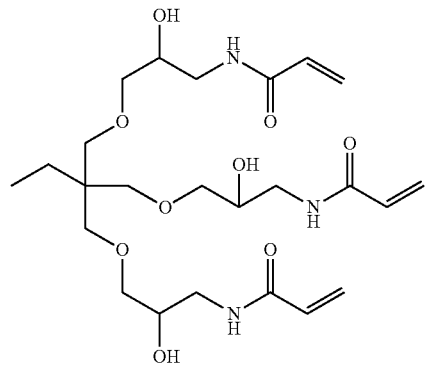
Polymerizable Compound 21
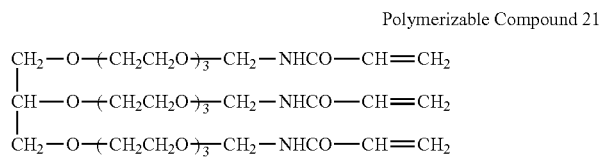
Polymerizable Compound 22
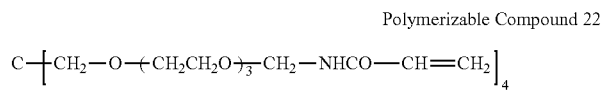
Polymerizable Compound 23
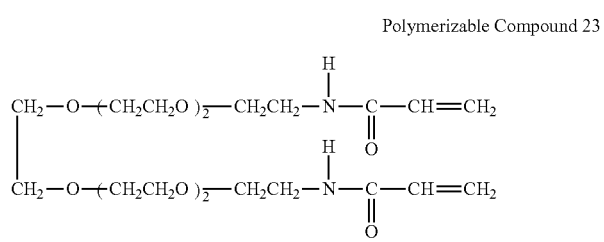
Polymerizable Compound 24
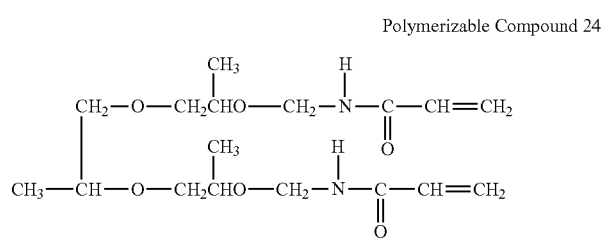
Polymerizable Compound 25
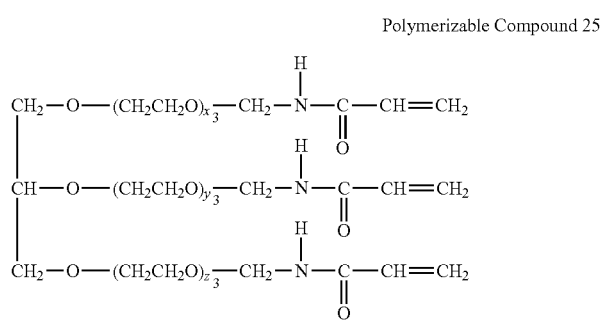
$x_3 + y_3 + z_3 = 6$
Polymerizable Compound 26
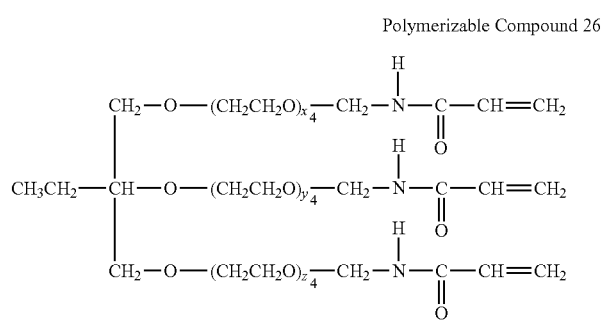
$x_4 + y_4 + z_4 = 9$ -continued
Polymerizable Compound 27
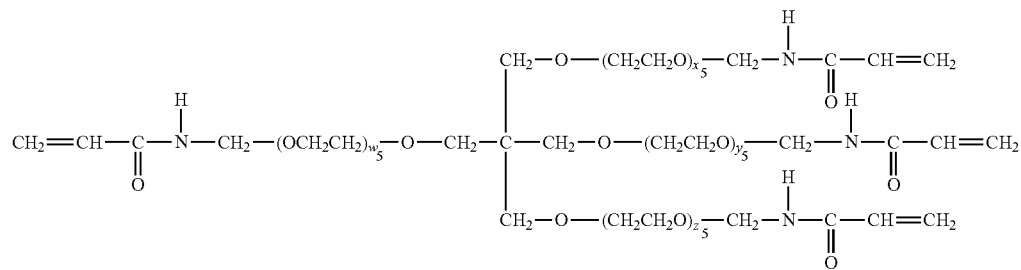
$w_5 + x_5 + y_5 + z_5 = 6$
Polymerizable Compound 28
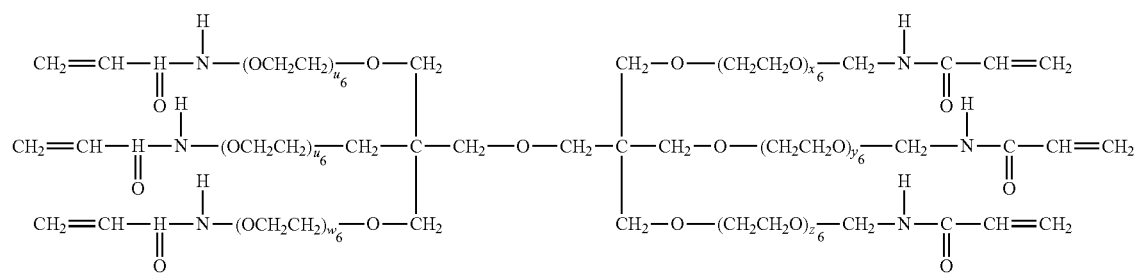
Polymerizable Compound 29
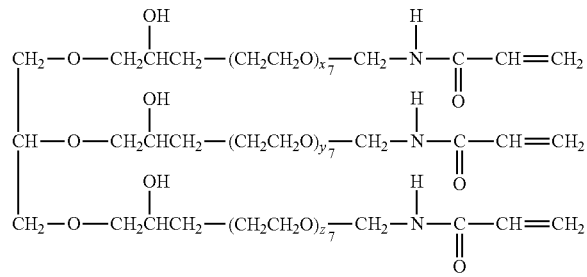
$x_7 + y_7 + z_7 = 3$
Polymerizable Compound 30
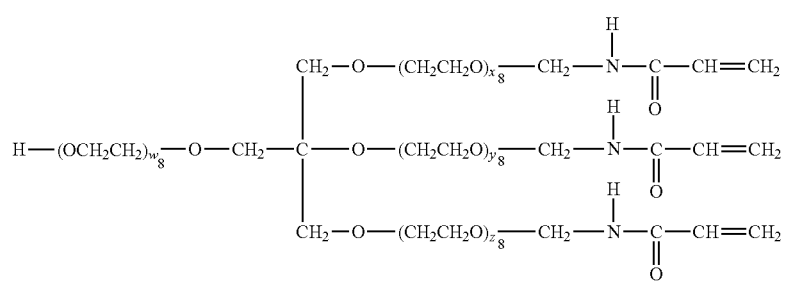
$x_8 + y_8 + z_8 = 6$
Polymerizable Compound 31
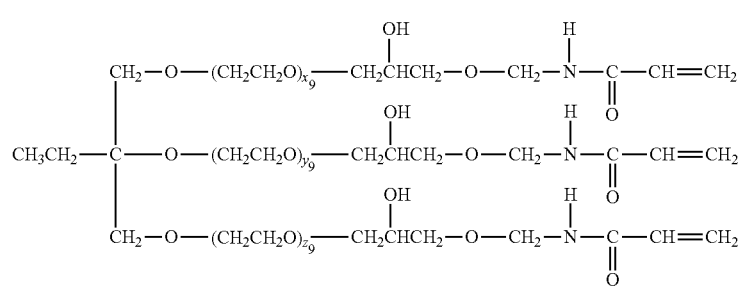
$x_9 + y_9 + z_9 = 3$

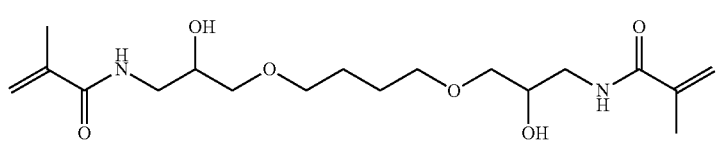

Polymerizable Compoumd 32

⑦ indicates text missing or illegible when filed

In addition to the polymerizable compounds described above, for example, a compound having a maleimide structure, a compound having a sulfamide structure, and a compound having an N-vinylacetamide structure, represented by the following Polymerizable Compounds can also be used.

Polymerizable Compound 33

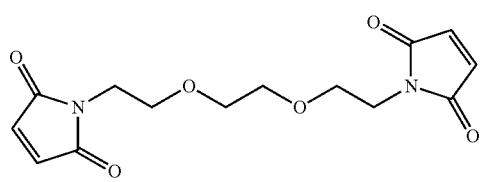

Polymerizable Compound 34

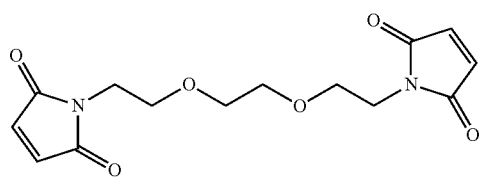

Polymerizable Compound 35

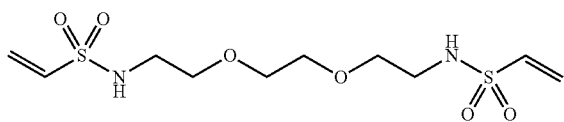

Polymerizable Compound 36

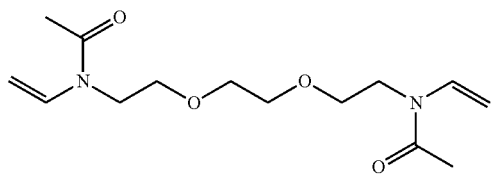

Polymerizable Compound 37

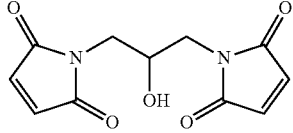

Polymerizable Compound 38

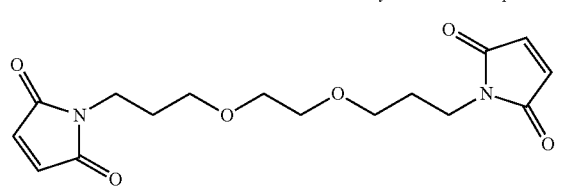

Polymerizable Compound 39

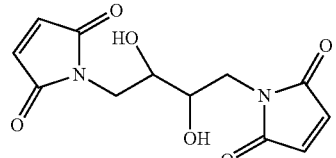

Polymerizable Compound 40

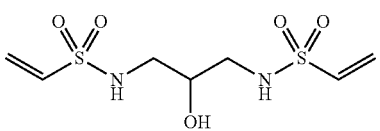

Polymerizable Compound 41

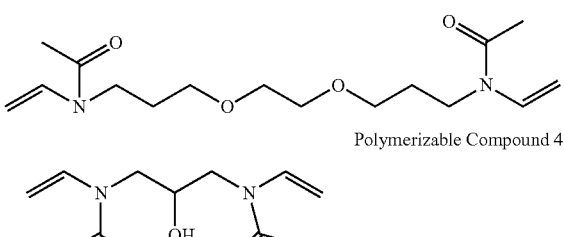

Polymerizable Compound 42

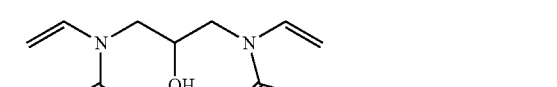

One type of polymerizable compound may be included alone or in combination of two or more types thereof.

A content of the polymerizable compound in the ink composition is preferably from 3% by mass to 50% by mass, more preferably from 10% by mass to 30% by mass, and further preferably from 15% by mass to 25% by mass, with respect to a total mass of the ink composition.

(Polymerization Initiator)

The ink composition includes at least one type of a polymerization initiator, and the polymerization initiator is preferably at least one type of a water-soluble polymerization initiator. Here, the term "water-soluble" in the polymerization initiator means that the polymerization initiator is dissolved in distilled water at 25° C. in an amount of 0.5% by mass or more. The water-soluble polymerization initiator is preferably dissolved in distilled water at 25° C. in an amount of 1% by mass or more, and more preferably in an amount of 3% by mass or more.

Examples of the water-soluble polymerization initiator include a compound represented by the following Formula (1) and compounds described in JP-A No. 2005-307198. Among them, the water-soluble polymerization initiator represented by the following Formula (1) is preferred from the viewpoint of rubbing resistance of an image.

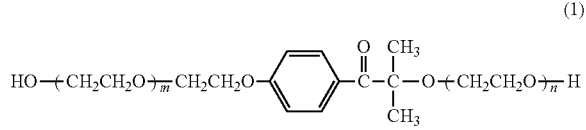

(1)

In Formula (1), m and n each independently represent an integer of 0 or more and m+n represents an integer of from 0 to 3, but it is preferable that m is from 0 to 3 and n is 0 or 1, and it is more preferable that m is 0 or 1 and n is 0.

Specific examples of the compound represented by Formula (1) are illustrated as follows, but the present invention is not limited to these.

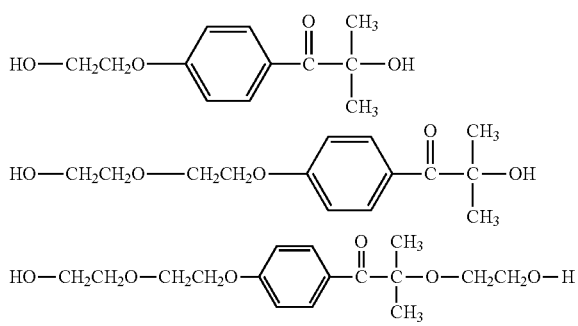

The compound represented by Formula (1) may be the compound synthesized according to the description in JP-A No. 2005-307198 or may be a commercially available compound. Examples of the commercially available compound represented by Formula (1) include IRGACURE 2959 (m=0 and n=0).

A content of the polymerization initiator in the ink composition is preferably in a range of from 0.1% by mass to 30% by mass, more preferably in a range of from 0.5% by mass to 20% by mass, further preferably in a range of from 1.0% by mass to 15% by mass, and most preferably in a range of from 1.0% by mass to 5.0% by mass, in terms of the solid content.

(Colloidal Silica)

The ink composition preferably includes at least one type of colloidal silica. When colloidal silica is included, ejection stability is improved and reduction of liquid-repellent property of the inkjet head member is prevented. These effects become particularly significant when silicon is used for at least a part of the inkjet head member.

It is thought that the hydrolysis of the ink component is effectively prevented by inclusion of colloidal silica, an excellent effect in ejection stability (recovery property after standing) is obtained by improving the stability of the ink composition even when ejection of an ink composition is stopped and allowed to stand for a certain period of time on an inkjet recording apparatus and then ink ejection is resumed, and moreover, rubbing resistance of an image is also satisfied. Further, it is assumed that colloidal silica is appropriately adsorbed on the surface of the inkjet head member to alleviate surface-erosion by the ink component, whereby the reduction of liquid repellency is prevented.

The colloidal silica is a colloid including fine particles of a silicon-containing inorganic oxide having an average particle diameter of 100 nm or less. The colloidal silica contains silicon dioxide (including a hydrate thereof) as a main component, and may contain an aluminate salt as a minor component. Examples of the aluminate salt which may be optionally contained as a minor component include sodium aluminate and potassium aluminate.

Further, the colloidal silica may contain an inorganic salt such as sodium hydroxide, potassium hydroxide, lithium hydroxide, or ammonium hydroxide; and an organic salt such as tetramethylammonium hydroxide. These inorganic salt and organic salt function as, for example, a stabilizing agent for colloid.

A dispersion medium for the colloidal silica is not particularly limited, and may be water, an organic solvent, or a mixture thereof. The organic solvent may be a water-soluble organic solvent or a water-insoluble organic solvent, but a water-soluble organic solvent is preferred. Specific examples thereof include methanol, ethanol, isopropyl alcohol, and n-propanol.

A manufacturing method of the colloidal silica is not particularly limited, and colloidal silica may be manufactured by a method that is commonly used. For example, the colloidal silica can be manufactured by synthesis of aerogel by thermal decomposition of silicon tetrachloride or using water glass. Alternatively, the colloidal silica can also be manufactured by a liquid-phase synthesis method such as hydrolysis of an alkoxide (for example, "Seni To Kogyo (*Fiber and Industry*)", Volume 60, No. 7 (2004), p. 376).

An average particle diameter of particles contained in the colloidal silica is not particularly limited, but preferably from 1 nm to 25 nm, more preferably from 3 nm to 20 nm, further preferably from 3 nm to 15 nm, and particularly preferably from 5 nm to 10 nm.

When the average particle diameter is 25 nm or less, damage (for example, reduction of liquid-repellency or the like) on a member forming a part of the inkjet head, for example, a base material, a protective film, a liquid-repellent film, or the like, by ink can be more effectively prevented. It is thought that a total surface area of particles is increased due to a small average particle diameter, thereby more effectively preventing damage on the member forming a part of the inkjet head, for example. Further, the average particle diameter of particles is preferably 25 nm or less from the viewpoints of ejection property of the ink composition and reduction of abradability of the particles. When the average particle diameter is 1 nm or more, productivity in manufacture of colloidal silica is increased, thereby obtaining colloidal silica with little variation in performance.

In the present invention, the average particle diameter of the colloidal silica can be determined by a general measurement method for dispersion particles such as a light scattering method and a laser diffraction method. However, in the present invention, particle diameters of 300 colloidal silica particles are measured by a transmission electron microscopy (TEM) tomography as a method in a more direct way to calculate the average value as the average particle diameter.

Further, a shape of the colloidal silica is not particularly limited so far as ink ejection performance is not impaired. The shape thereof may be, for example, a spherical shape, a longitudinal shape, a needle shape, or a beads shape. Among them, the shape thereof is preferably spherical from the viewpoint of ejection property of the ink.

The colloidal silica may be a product manufactured by a manufacturing method described above or may be a commercially available product. Specific examples of the commercially available product include Ludox AM, Ludox AS, Ludox LS, Ludox TM, and Ludox HS (all manufactured by E.I. du Pont de Nemours and Company); Snowtex S, Snowtex XS, Snowtex 20, Snowtex 30, Snowtex 40, Snowtex N, Snowtex C, and Snowtex O (all manufactured by Nissan Chemical Industries, Ltd.); Syton C-30 and Syton ZOO (all manufactured by Monsanto Company); Nalcoag-1060 and Nalcoag ID-21 to 64 (all manufactured by Nalco Company); methanol sol, isopropyl alcohol sol, methyl ethyl ketone sol, and toluene sol (all manufactured by Fuyo Chemical Industry Co., Ltd.); Cataloid S, Cataloid F120, Cataloid SI 350, Cataloid SI 500, Cataloid SI 30, Cataloid S 20L, Cataloid S 20H, Cataloid S 30L, Cataloid S 30H, Cataloid SI 40, and OSCAL 1432 (isopropyl alcohol sol) (all manufactured by JGC Catalysts and Chemicals Ltd.); Aderight (manufactured by ADEKA Corporation); and example of a beads-shape colloidal silica include commercially available products sold under the trade name of, for example, Snowtex ST-UP, Snowtex PS-S, Snowtex PS-M, Snowtex ST-OUP, Snowtex PS-SO, and Snowtex PS-MO (all manufactured by Nissan Chemical Industries Ltd.), and these are easily obtainable.

A pH of the commercially available colloidal silica dispersion is often adjusted to be acidic or basic. This is because a stable-dispersing region for colloidal silica exists in the acid side or the basic side. When a commercially available colloidal silica dispersion is added to the ink composition, both the pH of the stable dispersion region for the colloidal silica and a pH of the ink composition should be considered and then the commercially available colloidal silica dispersion is added.

The content of colloidal silica in the ink composition is not particularly limited, and preferably from 0.005% by mass to 0.5% by mass with respect to the total amount of the ink composition, more preferably from 0.005% by mass to 0.1% by mass with respect to the total amount of the ink composition, and particularly preferably from 0.01% by mass to 0.1% by mass with respect to the total amount of the ink composition. When the content of the colloidal silica in the ink composition is the above described upper limit or less, ejection property of the ink composition is improved, and an influence to the inkjet head is effectively suppressed due to reduction of abradability of the silica particles. When the content of the colloidal silica in the ink composition is the above described lower limit or more, reduction of liquid repellency of the liquid-repellent film on the surface of the inkjet head can be more effectively prevented.

Further, the ink composition preferably includes colloidal silica having an average particle diameter (determined by TEM tomography) of from 3 nm to 25 nm in an amount of from 0.005% by mass to 0.5% by mass with respect to the total amount of the ink composition, and more preferably colloidal silica having an average particle diameter of from 3 nm to 15 nm in an amount of from 0.005% by mass to 0.1% by mass with respect to the total amount of the ink composition, from the viewpoints of preventing reduction of liquid repellency of the liquid-repellent film on the surface of the inkjet head and ejection property of the ink.

A content ratio (amount of colloidal silica/amount of polymerizable compound) of the colloidal silica to the polymerizable compound in the ink composition is preferably from 0.0001 to 0.1, and more preferably from 0.001 to 0.05, based on mass.

When the content ratio of the colloidal silica to the polymerizable compound is 0.0001 or more, reduction of liquid repellency of the liquid-repellent film on the surface of the inkjet head is more effectively prevented. When the content ratio is 0.1 or less, ejection property of the ink is further improved.

(Surfactant)

The ink composition preferably includes at least one surfactant. The surfactant can be used as a surface tension adjuster.

As the surface tension adjuster, a compound which has a structure having both a hydrophilic site and a hydrophobic site in a molecule thereof can be effectively used, and any of an anionic surfactant, a cationic surfactant, an amphoteric surfactant, a nonionic surfactant other than the specific compound, and a betaine surfactant may be used.

When the ink composition includes a surfactant (surface tension adjuster), the surfactant is contained such an amount that the surface tension of the ink composition is adjusted preferably to a range of from 20 to 60 mN/m from the viewpoint of performing good ejection of the ink composition by an inkjet recording system. From the viewpoint of the surface tension, the surfactant is contained such an amount that the surface tension of the ink composition is adjusted more preferably to a range of from 20 to 45 mN/m, and the surface tension of the ink composition is adjusted further preferably to a range of from 25 to 40 mN/m.

A specific amount of the surfactant in the ink composition is not particularly limited except that the surface tension is adjusted to the above range, but is preferably 0.1% by mass or more, more preferably from 0.1% to 10% by mass, and further preferably from 0.2 to 3% by mass.

(Water-Soluble Organic Solvent)

The ink composition may include at least one type of water-soluble organic solvent. By the water-soluble organic solvent, effects such as preventing drying, wetting or promoting penetration are obtained. For preventing drying, the water-soluble organic solvent is used as a drying inhibitor for preventing the ink from adhering to and drying at an ink-ejection hole of an ejection nozzle to form agglomerates that cause cloggin. For preventing drying and wetting, a water-soluble organic solvent having a lower vapor pressure than that of water is preferred. For promoting penetration, the water-soluble organic solvent is used as a penetration promoting agent to increase ink penetration into paper.

Examples of the water-soluble organic solvent include an alkane diol (polyhydric alcohols) such as glycerin, ethylene glycol, and propylene glycol; sugar alcohols; alkyl alcohols having 1 to 4 carbon atoms such as ethanol, methanol, butanol, propanol, and isopropanol; and glycol ethers such as ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol mono-isopropyl ether, diethylene glycol mono-isopropyl ether, ethylene glycol mono-n-butyl ether, ethylene glycol mono-t-butyl ether, diethylene glycol mono-t-butyl ether, triethylene glycol monoethyl ether, 1-methyl-1-methoxybutanol, propylene glycol monomethyl ether, propylene glycol monoethyl ether, propylene glycol mono-t-butyl ether, propylene glycol mono-n-propyl ether, propylene glycol mono-isopropyl ether, dipropylene glycol, dipropylene glycol monomethyl ether, dipropylene glycol monoethyl ether, dipropylene glycol mono-n-propyl ether, dipropylene glycol mono-isopropyl ether, and tripropylene glycol monomethyl ether. These can be used alone or in combination of two kinds or more thereof.

(Resin Particles)

The ink composition may include resin particles if necessary.

Further, the resin particles preferably have a function that is capable of fixing an ink composition, that is, a print image, by increase in viscosity of the ink through aggregation or dispersion for destabilization, when the resin particles contact a treatment liquid described below or a region on a recording medium where the treatment liquid has been applied and dried. Such resin particles are preferably dispersed in water and at least one organic solvent.

Examples of resin particles that can be used include an acrylic-based resin, a vinyl acetate-based resin, a styrene-butadiene-based resin, a vinyl chloride-based resin, an acrylic-styrene-based resin, a butadiene-based resin, a styrene-based resin, a cross-linked acrylic-based resin, a cross-linked styrene-based resin, a benzoguanamine resin, a phenol resin, a silicone resin, an epoxy resin, a urethane-based resin, a paraffin-based resin, a fluororesin, and the latex thereof. Preferred examples thereof include an acrylic-based resin, an acrylic-styrene-based resin, a styrene-based resin, a cross-linked acrylic-based resin, and a cross-linked styrene-based resin.

The resin particles may be used in a form of latex.

The weight average molecular weight of the resin particles is preferably from 10,000 to 200,000, and more preferably from 20,000 to 200,000.

The average particle diameter of the resin particles is preferably in a range of from 1 nm to 1 μm, more preferably in a range of from 1 nm to 200 nm, further preferably in a range of 1 nm to 100 nm, and particularly preferably in a range of from 1 nm to 50 nm.

A glass transition temperature Tg of the resin particles is preferably 30° C. or more, more preferably 40° C. or more, and particularly preferably 50° C. or more.

An amount of the resin particles added with respect to the ink composition is preferably from 0.1 to 20% by mass, more preferably from 0.1 to 10% by mass, and further preferably from 0.1 to 5% by mass.

The particle size distribution of resin particles is not particularly limited, and resin particles having a wide particle size distribution or having a monodispersed particle size distribution may be used. Two types or more of the resin particles having a monodispersed particle size distribution may also be mixed and used.

(Other Components)

The ink composition may further include, as other components, various additives, in addition to the above components, if necessary.

Examples of various additives include known additives such as an ultraviolet absorber, a color fading inhibitor, a fungicide, a pH adjuster, a corrosion inhibitor, an antioxidant, an emulsion stabilizer, a preservative, a defoamer, a viscosity control agent, a dispersion stabilizer, and a chelating agent. The content of the additive can be appropriately determined according to the application thereof, and for example, the additive may be contained in a range of from about 0.02% by mass to about 1.00% by mass in the ink composition.

Examples of the ultraviolet absorber include a benzophenone-based ultraviolet absorber, a benzotriazole-based ultraviolet absorber, a salicylate-based ultraviolet absorber, a cyanoacrylate-based ultraviolet absorber, and a nickel complex salt-based ultraviolet absorber.

As the color fading inhibitor, various organic- and metal complex-based color fading inhibitor may be used. Examples of an organic color fading inhibitor include hydroquinones, alkoxyphenols, dialkoxyphenols, phenols, anilines, amines, indanes, chromanes, alkoxyanilines, and heterocyclics, and examples of a metal complex include a nickel complex and a zinc complex.

Examples of the fungicide include sodium dehydroacetate, sodium benzoate, sodium pyridinethione-1-oxide, ethyl ester of p-hydroxy benzoic acid, 1,2-benzoisothiazoline-3-one, sodium sorbate, and sodium pentachlorophenol.

A pH adjuster is not particularly limited so far as the pH adjuster does not have the adverse effects on the formed ink composition and pH can be adjusted to a desired value, and can be appropriately selected in accordance with the purpose.

Examples of the pH adjustor include alcoholamines (for example, diethanolamine, triethanolamine, and 2-amino-2-ethyl-1,3-propanediol), alkali metal hydroxides (for example, lithium hydroxide, sodium hydroxide, and potassium hydroxide), ammonium hydroxide (for example, ammonium hydroxide and quaternary ammonium hydroxide), and phosphonium hydroxides, and alkali metal carbonates.

Examples of the corrosion inhibitor include acidic sulfite salts, sodium thiosulfate, ammonium thiodiglycolate, diisopropylammonium nitrite, pentaerythritol tetranitrate, and dicylclohexylammonium nitrite.

Examples of the antioxidant include a phenol-based antioxidant (including a hindered phenol-based antioxidant), an amine-based antioxidant, a sulfur-based antioxidant, and a phosphorous-based antioxidant.

Examples of the chelating agent include sodium ethylenediamine tetraacetate, sodium nitrilotriacetate, sodium hydroxyethylethylenediamine triacetate, sodium diethylenetriamine pentaacetate, and sodium uramildiacetate.

(Physical Properties of Ink Composition)

Surface tension (25° C.) of the ink composition is preferably from 20 mN/m to 60 mN/m, more preferably from 20 mN/m to 45 mN/m, and further preferably from 25 mN/m to 40 mN/m.

Surface tension of the ink composition is determined under the condition at 25° C. using an automatic surface tensiometer CBVP-Z (manufactured by Kyowa Interface Science Co., Ltd.).

Viscosity of the ink composition at 25° C. is preferably from 1.2 mPa·s to 15.0 mPa·s, more preferably from 2 mPa·s to less than 13 mPa·s, and further preferably from 2.5 mPa·s to less than 10 mPa·s.

Viscosity of the ink composition is determined under the condition at 25° C. using a viscometer TV-22 (manufactured by TOKI SANGYO Co., Ltd.).

[Method of Ejecting Ink Composition]

In the ink ejection process, the ink composition is ejected from an inkjet head having a liquid-repellent film on an ejection surface thereof.

Ejection of the ink composition is not particularly limited so far as the ink composition is ejected from an inkjet head having a liquid-repellent film on an ejection surface thereof and performed by a common inkjet recording method.

Ejection of the ink composition by the inkjet recording method can be performed, for example, by ejecting ink, by providing ejection energy, onto a desired recording medium, that is, plain paper, resin coated paper, ink jet paper, for example, described in JP-A No. H8-169172, JP-A No. H8-27693, JP-A No. H2-276670, JP-A No. H7-276789, JP-A No. H9-323475, JP-A No. S62-238783, JP-A No. H10-153989, JP-A No. H10-217473, JP-A No. H10-235995, JP-A No. H10-217597, and JP-A No. H10-337947, a film, paper for common use in inkjet recording and electrophotographic transfer, fabrics, glass, metals, and ceramics. As the ink ejection method preferred in the present invention, a method described in JP-A No. 2003-306623, paragraph 0093 to 0105 can be applied.

The inkjet recording method is not particularly limited, and the inkjet recording method may be a known method, for example, any system such as an electric charge controlling system of using an electrostatic attraction force to eject ink, a drop-on-demand system (pressure pulse system) of using oscillating pressure generated by a piezoelectric element, an acoustic inkjet system of ejecting ink using radiation pressure by irradiating ink with an acoustic beam transduced from an electric signal, and a thermal inkjet system (Bubble Jet, registered trademark) of using a pressure generated by bubbles that are formed by heating ink.

An embodiment of the inkjet recording method also includes a system of injecting a large number of small-volume ink having a low concentration which is referred to as a photo ink, a system of improving image quality using plural inks with substantially the same hue but different concentration, and a system of using colorless-transparent ink.

Further, an inkjet head used in the inkjet recording method may be a drop-on-demand system or a continuous system.

Specific examples of the ink ejection method include an electric-mechanical conversion system (for example, single cavity type, double cavity type, bender type, piston type, share mode type, and shared wall type), an electric-thermal conversion system (for example, thermal inkjet type, and BUBBLE JET (registered trademark) type), an electrostatic suction system (tier example, electric field control type and a slit jet type), and an electric discharge system (for example, spark jet type), but any ink ejection method may be used.

An ink nozzle or the like used for recording in inkjet recording system is not particularly limited, and can be appropriately selected depending on the purpose.

Examples of ejection of ink in the inkjet recording method include a shuttle system in which a short serial head is used and recording is performed while allowing the head to scan in the width direction of a recording medium, and a line system in of using a line head in which recording elements are arrayed corresponding to a whole area of one side of a recording medium (one of sides in the width direction).

In a line system, an image recording can be performed on a whole surface of a recording medium by moving the recording medium in a direction orthogonal to the direction of the alignment of recoding elements, and a conveyance system such as a carriage or the like by which the short head moves for scanning is not necessary. Further, since complicate scanning control for the movement of the carriage and the recording medium is not necessary and only the recoding medium is moved, higher recording speed can be attained compared to the shuttle system.

In the present invention, among the line systems, a single-pass system in which the recording medium is scanned only one time to form an image is preferably used.

When the line system is used in the ink ejection process, by using not only one kind of ink composition, but also two or more kinds of ink compositions, the ink ejection (impinging) interval between previously ejected ink composition (the n th color (n≥1), for example, the second color) and the subsequently ejected ink composition (the n+1 th color (for example, the third color) can be one second or less, thereby performing recording suitably.

The inkjet head may be provided with a nozzle plate at which plural ejection holes are two-dimensionally arrayed. The nozzle plate may be disposed on a side of the ejection surface of the line head, and ejection holes may be disposed at a position corresponding to the recording elements on the nozzle plate.

The nozzle plate has a larger liquid-repellent film formation area, as compared to the short serial head used in the shuttle system in which recording is performed by the inkjet head that is scanned in a width direction of a recording medium. Therefore, when a carbon black pigment in an ink composition has abradability, deterioration of the liquid-repellent film tends to be more severe.

However, when an ink composition is ejected by the image formation method of the present invention, deterioration of the liquid-repellent film can be prevented even in inkjet recording using the nozzle plate.

The amount of ink droplet of the ink composition ejected from an inkjet head is preferably from 0.5 picoliters (pl) to 6 pl, more preferably from 1 pl to 5 pl, and further preferably from 2 pl to 4 pl, from the viewpoint of obtaining a high-resolution image.

(Liquid-Repellent Film)

A liquid-repellent film is provided on a surface of the inkjet head used in the image formation method of the present invention.

The liquid-repellent film repels an ink composition to prevent adhesion to a surface of inkjet head. Further, the liquid-repellent film effectively ameliorates dripping of the ink composition at the time of ink ejection, and improves ejectability of the ink composition from an inkjet head.

A constitutional material of the liquid-repellent film is not particularly limited, but preferably contains a fluorocarbon compound from the viewpoints of ameliorating of dripping of the ink composition and stably ejecting the ink composition.

The solubility parameter (SP) of the liquid-repellent film calculated by the Okitsu method is preferably $16.00 \, \text{MPa}^{1/2}$ or less, more preferably $15.00 \, \text{MPa}^{1/2}$ or less, and particularly preferably $13.00 \, \text{MPa}^{1/2}$ or less, from the viewpoint of effectively ameliorating dripping of ink.

As the fluorocarbon compound contained in the liquid-repellent film, for example, a compound containing a fluoroalkyl group may be preferably used.

The liquid-repellent film is preferably a liquid-repellent film prepared using, for example, a fluoroalkylsilane compound.

As the fluoroalkylsilane compound, a fluoroalkylsilane compound represented by the following Formula (F) is preferably used. The fluoroalkylsilane compound represented by the following Formula (F) is a silane coupling compound.

$$C_nF_{2n+1}—C_mH_{2m}—Si—X_3 \quad \quad \text{Formula (F)}$$

In Formula (F), n represents an integer of 1 or more and m represents 0 or an integer of 1 or more. X represents an alkoxy group, an amino group or a halogen atom. A part of X may be substituted with an alkyl group.

Examples of the fluoroalkylsilane compound include a fluoroalkyltrichlorosilane such as $C_8F_{17}C_2H_4SiCl_3$ (also referred to as "1H, 1H, 2H, 2H-perfluorodecyltrichlorosilane" or "FDTS") and s $CF_3(CF_2)_8C_2H_4SiCl_3$, and a fluoroalkylalkoxysilane such as $CF_3(CF_2)_8C_2H_4Si(OCH_3)_3$, 3,3,3-trifluoropropyltrimethoxysilane, tridecafluoro-1,1,2,2-tetrahydrooctyltrimethoxysilane, and heptadecafluoro-1,1,2,2-tetrahydrodecyltrimethoxisilane.

In Formula (F), it is preferred that n is an integer of from 1 to 14, m is 0 or an integer of from 1 to 5, and X is an alkoxy group or a halogen atom, and it is more preferable that n is an integer of from 1 to 12, m is 0 or an integer of from 1 to 3, and X is an alkoxy group or a halogen atom, in terms of liquid repellency and durability of the liquid-repellent film.

Among them, $C_8F_{17}C_2H_4SiCl_3$ is most preferred.

A fluorocarbon compound forming a part of the liquid-repellent film preferably contains an oxygen atom. Deterioration of the liquid-repellent film is more effectively prevented by forming a part of the liquid-repellent film with a fluorocarbon compound containing an oxygen atom. As the fluorocarbon compound containing an oxygen atom, an oxygen-containing fluoroalkyl compound is preferred, and a compound having a perfluoropolyether (PTPE) group (—$CF_2$—O—$CF_2$—) is preferably used.

A commercially available product may be also used.

Specific examples of the commercially available product include a silane coupling agent such as OPTOOL (manufactured by Daikin Industries, Ltd.), DURASURF (manufactured by HARVES Co., Lt d.), Novec EGC-1720 (manufactured by Sumitomo 3M Co., Ltd.), Fluorolink S-10 (manufactured by Solvay Solexis Co., Ltd.), NANOS (manufactured by T & K Inc.), SIFEL KY-100 (manufactured by Shin-Etsu Chemical Co., Ltd., and Cytop M type (manufactured by Asahi Glass Co., Ltd.).

The thickness of the liquid-repellent film containing a fluorocarbon compound is not particularly limited, but preferably in a range of from 0.2 nm, to 30 nm, and more preferably in a range of from 0.4 nm to 20 nm. There is no particular problem in a liquid-repellent film having the thickness in a range of more than 30 nm, but the liquid-repellent film having the thickness of 30 nm or less is advantageous in terms of uniformity of the film, and when the thickness is 0.2 nm or more, the film has good water repellency to ink.

As the liquid-repellent film containing a fluorocarbon compound, for example, a monomolecular film (self-assembled monolayer (SAM) film) of a fluoroalkylsilane compound and a multilayered film of a fluoroalkylsilane compound can be used. Here, an embodiment of the multilayered film of a fluoroalkylsilane compound includes a polymerized film of a fluoroalkylsilane compound in addition to a layered film without polymerization of the fluoroalkylsilane compound.

The liquid-repellent film containing a fluorocarbon compound may be formed, for example, by the method described in JP-A No. 2011-111527, paragraphs 0114 to 0124.

Specifically, the liquid-repellent film containing a fluorocarbon compound can be formed, for example, by deposition using the chemical vapor deposition method, coating with a fluororesin, the electrolytic codeposition with a fluoropolymer or the like, treatment with a fluorosilane, treatment with an aminosilane, plasma polymerization of fluorocarbons or the like.

Specific examples of the method of forming the liquid-repellent film containing a fluorocarbon compound include the following method.

A first example may be, for example, a method in which a fluoroalkyltrichlorosilane such as $CF_3(CF_2)_8C_2H_4SiCl_3$ is reacted with a base material to form a water-repellent monomolecular film or a polymerized film. (for example, Japanese Patent Application Publication (JP-B) No. 2500816 and JP-B No. 2525536.)

In the chemical formula, $CF_3(CF_2)_8C_2H_4$— is a fluoroalkyl group and —$SiCl_3$ is a trichlorosilyl group.

In the method, a base material in which an active hydrogen atom is present on a surface thereof is exposed to a solution in which a fluoroalkyltrichlorosilane is dissolved to react the active hydrogen atom with the chlorosilyl group (—SiCl), thereby forming a Si—O bond with the base material. As a result, the fluoroalkyl group is fixed to the base material through a Si—O bond. The fluoroalkyl group imparts water repellency to the film. The liquid-repellent film may be a monomolecular film or a polymerized film depending on the film forming condition.

A second example may be, for example, a method in which a porous base body what is impregnated with a compound containing a fluoroalkyl group such as a fluoroalkylalkoxysilane, for example, $CF_3(CF_2)_8C_2H_4Si(OCH_3)_3$, is heated under vacuum to vaporize the compound, thereby imparting liquid repellency to a surface of the base material. (for example, JP-A No. H6-143586).

In this method, an intermediate layer such as silicon dioxide may be provided in order to increase adhesion between the liquid-repellent film and the base material.

A third example may be, for example, a method in which a fluoroalkylsilane is formed on a surface of a base material by a chemical vapor deposition method using a fluoroalkyltrichlorosilane such as $CF_3(CF_2)_8C_2H_4SiCl_3$. (for example, JP-A No. 2000-282240).

A fourth example may be, for example, a method in which after fine particles of an oxide of zirconia of alumina are formed on a surface of a base material, a fluoroaloxychlorosilane or a fluoroalkylalkoxysilane is applied thereto. (for example, JP-A No. H6-171094).

A fifth example may be, for example, a method in which after a mixture solution of a fluoroalkylalkoxysilane to which a metal alkoxide is added is hydrolyzed and polymerized by dehydration, the solution is applied to a base material and then calcined to form a liquid-repellent film in which a molecule having a fluoroalkyl chain is mixed in the metal oxide. (for example, JP-B No. 2687060, JP-B No. 2874391, JP-B No. 2729714, and JP-B No. 2555797).

In the method, the fluoroalkyl chain imparts water repellency to the film and the metal oxide imparts good mechanical strength to the film.

Among these film forming methods, the chemical vapor deposition method described as the third example is preferred.

An embodiment of the chemical vapor deposition method includes an embodiment in which a vessel containing a fluoroalkylsilane compound and a nozzle plate (for example, a nozzle plate made of a silicon substrate) are disposed in a closed container made of Teflon (registered trademark) or the like, the temperature is increased by placing the whole closed container in an electric furnace or the like to evaporate the fluoroalkylsilane compound, thereby depositing a molecule of the fluoroalkylsilane compound on the surface of the nozzle plate.

In this way, a monomolecular film of the fluoroalkylsilane compound can be formed on the nozzle plate by the chemical vapor deposition method, for example. In this case, a deposition surface of the nozzle plate is preferably made hydrophilic. Specifically, for example, the surface of a nozzle plate made of a silicon substrate is cleaned using ultraviolet light (wavelength: 172 nm) to remove organic impurities, thereby obtaining a clean surface. Since the surface of silicon is naturally oxidized to cover with a $SiO_2$ film, moisture in the atmosphere is immediately adsorbed on the surface to cover with an OH group, thereby making the surface hydrophilic.

Another embodiment of the chemical vapor deposition method includes the following method.

That is, a liquid-repellent film can be deposited on a surface of a silicon substrate by introducing a fluoroalkyltrichlorosilane compound such as $CF_3(CF_2)_8C_2H_4SiCl_3$ and moisture into a CVD reactor.

A partial pressure of the fluoroalkyltrichlorosilane compound such as $CF_3(CF_2)_8C_2H_4SiCl_3$ may be in a range of from 0.05 to 1 torr (6.67 to 133.3 Pa) (for example, from 0.1 to 0.5 torr (13.3 to 66.5 Pa)), and a partial pressure of $H_2O$ may be in a range of from 0.05 to 20 torr (for example, 0.1 to 2 torr).

The deposition temperature may be in a range of from an ambient temperature to 100° C. The coating process can be performed, for example, using a Molecular Vapor Deposition (MVD) TM machine from Applied Micro Structures, Inc.

(Nozzle Plate)

A nozzle plate has a structure in which plural ejection holes are arrayed two-dimensionally. The number of plural ejection holes is not particularly limited, and appropriately selected in light of higher image formation speed.

A nozzle plate containing silicon (hereinafter, also referred to as a "silicon nozzle plate") is preferred as the nozzle plate.

Single crystal silicon or polysilicon may be used as silicon.

As the silicon nozzle plate, for example, a plate at which a film of, for example, a metal oxide (silicon oxide, titanium oxide, chromium oxide, tantalum oxide (preferably $Ta_2O_5$, or the like), a metal nitride (titanium nitride and silicon nitride, or the like) and a metal (zirconium, chromium, titanium, or the like) is formed on a silicon substrate may be used.

Here, silicon oxide may be an $SiO_2$ film formed by oxidation of a whole or a part of the surface of the silicon substrate.

The silicon nozzle plate may also be formed by replacing a part of silicon with glass (for example, borosilicate glass, photosensitive glass, quartz glass, and soda lime glass).

Among them, a film including tantalum oxide connection with tantalum pentoxide particularly has excellent resistance to ink, particularly obtaining good erosion resistance to alkaline ink.

An embodiment of a method for forming a film including silicon oxide ($SiO_2$ film) is described.

For example, a silicon substrate is accommodated in a chemical vapor deposition (CVD) method reactor, into which $SiCl_4$ and moisture are introduced to form an $SiO_2$ film on the silicon substrate.

A partial pressure of $SiCl_4$ may be in a range of from 0.05 to 40 torr (6.67 to $5.3 \times 10^3$ Pa) (for example, from 0.1 to 5 torr (13.3 to 666.5 Pa), and a partial pressure of $H_2O$ may be in a range of from 0.05 to 20 torr (for example, 0.2 to 10 torr). The deposition temperature is generally from an ambient temperature to 100° C.

As another embodiment, an $SiO_2$ film can also be formed on a silicon substrate by sputtering silicon oxide.

In any of the embodiments, a surface of the silicon substrate on which an $SiO_2$ film is formed is preferably cleaned (for example, by irradiation with oxygen plasma) before forming an $SiO_2$ film.

(Inkjet Head Equipped with Nozzle Plate)

FIG. 1 is a schematic cross-sectional diagram illustrating one example of an inkjet head equipped with a nozzle plate.

As illustrated in FIG. 1, an inkjet head 100 is provided with a nozzle plate 11 having ejection holes (nozzles) and an ink supply unit 20 provided at a side of the nozzle plate opposite to the direction of ink ejection. The nozzle plate 11 is provided with plural ejection holes 12 for ejection of ink. The ejection surface of the nozzle plate 11 plate is provided with a liquid-repellent film 13 containing a fluorocarbon compound.

Figure 2:
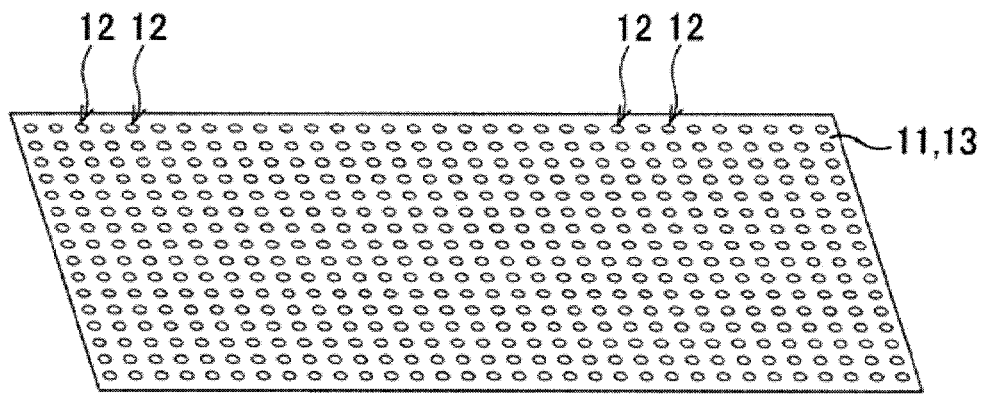
FIG. 2 is a schematic diagram illustrating one example of an ejection hole-arrangement of a nozzle plate.

FIG. 2 is a perspective diagram schematically illustrating an ejection surface of (a surface at which the liquid-repellent film 13 is formed) of the nozzle plate 11.

As illustrated in FIG. 2, plural ejection holes (nozzles) are two-dimensionally arrayed in the nozzle plat 11. The number of ejection holes is not limited and can be appropriately selected in light of higher image formation speed or the like, and the number of ejection holes may be, for example, 32×60.

For the nozzle plate 11, the nozzle plate containing the silicon described above (silicon nozzle plate) can be used, and for example, a silicon nozzle plate with a structure of which silicon is exposed at least in an inner wall of the nozzle and to a plate surface at a side of the direction of ink ejection is preferred.

However, while not illustrated in the figures, the nozzle plate 11 may be a silicon nozzle plate including a silicon substrate and a silicon oxide film provided on the silicon substrate. In this case, the silicon oxide film is disposed between the silicon substrate and the liquid-repellent film 13 containing a fluorocarbon compound.

The ink supply unit 20 is provided with plural pressure chambers 21 each of which connects the plural ejection holes 12 of the nozzle plate 11 through the nozzle communication channel 22; plural ink supply flow channels 23 each of which supplies the ink to the plural pressure chambers 21; common liquid chamber 25 which supplies ink to the plural ink supply flow channels 23; and pressure generating part 30 which deforms each of the plural pressure chambers 21.

The ink supply flow channel 23 is formed between the nozzle plate 11 and the pressure generating means 30, and the ink supplied to the common liquid chamber 25 flows. The ink supply flow channel 23 is connected to one end of the supply control channel 24 that connects the pressure chamber 21, and the amount of ink supplied from the ink supply flow channel 23 is adjusted to a desired amount and flows to the pressure chamber 21. The ink supply flow channel 23 is provided with plural supply control channels 24, ink is supplied to the pressure chamber 21 disposed adjacent to the pressure generating part 30 through the ink supply flow channel 23.

In this way, a large amount of ink can be supplied to plural ejection holes.

The pressure generating part 30 is configured to stack a vibration plate 31, an adhesion layer 32, a lower electrode 33, a piezoelectric layer 34, and an upper electrode 35 in this order from a side of the pressure chamber 21, and connected to an electric wiring that supplies a driving signal from exterior. Ink is ejected from the ejection hole 12 through the nozzle communication channel 22 by deforming the piezoelectric element depending on the image signal.

A circulation valve 41 is also provided near the ejection hole 12 such that the ink is always recovered to the circulation channel 42. By this structure, increase in ink viscosity near the ejection hole when ink is not ejected can be prevented.

(Recording Medium)

An ink composition is ejected onto a recording medium in the ink ejection process.

The recording medium is not particularly limited, but general printing paper containing cellulose as a main component for general offset printing, such as so-called high-quality paper, coat paper, and art paper can be used. Ink absorption and drying of the ink is relatively slow, and migration of the color material tends to occur after ejection of ink on the general printing paper containing cellulose as a major component by a general inkjet method using a water-soluble ink, thereby reducing the image quality. However, according to the ink forming method of the invention, the migration of color material is prevented and recording a high quality image having excellent color density and hue is possible.

Commercially available common products can be used as a recording medium, and examples thereof include high-quality paper (A) such as "OK Prince high-quality" manufactured by Oji Paper Co., Ltd., "Shiraoi" manufactured by Nippon Paper Industries Co., Ltd., and "New NPI high quality" manufactured by Nippon Paper Industries Co., Ltd.; ultra light weight coat paper such as "OK Everlight Coat" manufactured by Oji Paper Co., Ltd. and "AURORA-S" manufactured by Nippon Paper Industries Co., Ltd.; lightweight coating paper (A3) such as "OK Coat L" manufactured by Oji Paper Co., Ltd. and "AURORA-L" manufactured by Nippon Paper Industries Co., Ltd.; coat paper (A2 and B2) such as "OK Topcoat +" manufactured by Oji Paper Co., Ltd. and "AURORA Coat" manufactured by Nippon Paper Industries Co., Ltd.; and art paper (A1) such as "OK Kanefuji +" manufactured by Oji Paper Co., Ltd. and "Tokuhishi Art" manufactured by Mitsubishi Paper Mills Ltd. Various paper exclusively for photo for inkjet recording may also be used.

The water absorption coefficient Ka of a recording medium is preferably from 0.05 to 0.5 mL/m$^2$·ms$^{1/2}$, more preferably from 0.1 to 0.4 mL/m$^2$·ms$^{1/2}$, and further preferably from 0.2 to 0.3 mL/m$^2$·ms$^{1/2}$, from the viewpoints of effectively preventing the color migration of the coloring material and obtaining a high quality image having better color density and hue than the conventional image.

The water absorption coefficient Ka has the same definition as the definition according to JAPAN TAPPI test methods for pulp and paper No. 51, 2000 (publisher: JAPAN TAPPI), and specifically, the absorption coefficient Ka is calculated from the difference of the water-transfer amount between at the contact time of 100 ms and at the contact time of 900 ms, using an automatic scanning liquid absorptometer KM500 Win (manufactured by Kumagai Riki Kogyo, Co. Ltd.).

Among recording media, so-called coating paper used in general offset printing is preferred. The coating paper is the paper in which a coating material is applied to a surface of high quality paper which contains cellulose as a main component and is generally not surface-treated or alkaline paper, to form a coat layer. The coat paper is likely to generate quality problems of image gloss or scratch resistance in image formation using common water-soluble inkjet recording ink. However, in the image formation method of the present invention, an image with excellent gloss and good rubbing resistance can be obtained while preventing gloss unevenness. Particularly, coating paper including a base paper and a coat layer containing kaolin and/or calcium bicarbonate is preferably used. More specifically, art paper, coat paper, light weight coat paper, and ultra-light weight coating paper are more preferred.

<Maintenance Process>

The image formation method of the present invention preferably includes a maintenance process of removing an ink composition, or an ink deposit derived from the ink composition, that is adhered to a liquid-repellent film.

When an ink composition contains an untreated carbon black pigment or does not contain a specific compound even though a specific oxidative-treated pigment is contained, the liquid-repellent film tends to be abraded with the carbon black pigment to deteriorate. Particularly, the liquid-repellent film tends to be more abraded and deteriorated by wiping out an ink composition or an ink deposit derived from the ink composition (also referred to as a "ink composition and the like") to remove the ink composition and the like.

Even in such a case, when the ink composition used in the image formation method of the present invention is used as an ink composition, deterioration of the liquid-repellent film is prevented, since an untreated carbon black pigment and a specific oxidative-treated pigment are less likely to be exposed.

In the maintenance process, the ink composition or the deposit derived from the ink composition are removed by scraping with a wiper blade or wiping with cloths or papers.

Further, the maintenance process may include applying a maintenance fluid to a circumference of an inkjet head or the like (for example, ink flow path, hereinafter, also referred to as the head or the like). The ink deposit derived from ink on the surface of the nozzle is dissolved or swelled by application of the maintenance fluid to the head or the like, and therefore it is easier to be removed.

The maintenance fluid may be applied before or after scraping the ink composition or the like with a wiper blade or wiping with cloths and papers. Preferable examples of a method include a method (wiping) of wiping a nozzle surface to scrape off the ink deposit using a wiper blade after application of the maintenance fluid, a method of removing the ink deposit with a wind pressure or a liquid pressure of the maintenance fluid, and a method of wiping the ink deposit with cloths and papers. Among them, scraping with a wiper blade and wiping with cloths and papers are preferred.

A material for the wiper blade is preferably rubber with elasticity, and specific examples of the material include butyl rubber, chloroprene rubber, ethylene-propylene rubber, silicone rubber, urethane rubber, and nitrile rubber. A wiper blade coated with a fluororesin or the like for imparting ink repellency to the wiper blade may be used.

<Treatment Liquid Application Process>

The image formation method of the present invention preferably includes an application process of a treatment liquid containing a coagulant that is capable of forming an aggregate on a recording medium by contacting the ink composition.

In the treatment liquid application process, a treatment liquid that is capable of forming an aggregate (treatment liquid) by contacting the ink composition is applied to a recording medium to form an images by contacting the treatment liquid with the ink composition. In this case, dispersed particles such as resin particles contained in the ink composition as necessary, in addition to the specific oxidative-treated pigment in the ink composition agglutinate to fix an image on a recording medium. Accordingly, higher image formation speed can be achieved, and further, an image with higher image density and image resolution can be obtained even when higher image formation speed is achieved.

A detail of each component in the treatment liquid and a preferred embodiment are described below.

Application of the treatment liquid can be performed by applying a known method such as a coating method, an inkjet method, an immersion method, or the like. Examples of the coating method include a known coating method using a bar coater, an extrusion die coater, an air-doctor coater, a blade coater, a rod coater, an air knife coater, a squeeze coater, and a reverse roll coater. A detail of the inkjet recording method is as described above.

The treatment liquid application process may be provided before or after the ink ejection process.

In the present invention, an embodiment in which an ink ejection process is provided after applying a treatment liquid in a treatment liquid application process is preferred. That is, an embodiment in which a treatment liquid for agglutinating the coloring material (resin coated quinacridone-based pigment) in the ink composition is applied to a recording medium in advance before ejecting the ink composition, and then the ink composition is ejected such that the ink composition contacts the treatment liquid which has been applied onto the recoding medium to form an image is preferred. In this way, higher inkjet recording speed can be achieved, thereby obtaining an image with high density and resolution even when high speed recording is performed.

The amount of a treatment liquid applied is not particularly limited so far as the treatment liquid can agglutinate the ink composition, but preferably the amount of an coagulation component (for example, a carboxylic acid having a valency of 2 or more or an cationic organic compound) applied is 0.1 g/m$^2$ or more. Among them, the amount of coagulation component applied is preferably from 0.1 to 1.0 g/m$^2$, and more preferably from 0.2 to 0.8 g/m$^2$. When the amount of the coagulation component applied is 0.1 g/m$^2$ or more, aggregation reaction proceeds smoothly and when the amount of the coagulation component applied is 1 g/m$^2$ or less, glossiness is not too high, therefore, the above range is preferable.

Further, in the present invention, it is preferred that an ink ejection process is provided after a treatment liquid application process, and a heating and drying process of heating and drying the treatment liquid on a recording medium is further provided after application of the treatment liquid to the recording medium but before ejection of the ink composition. Coloring property of the ink is improved such as prevention of smear by heating and drying the treatment liquid in advance before the ink ejection process, whereby a visible image with good color density and color hue can be recorded.

Heating and drying can be performed by a known heating method such as use of a heater, a blow method using air blow from a drier, or a combination thereof. Examples of the heating method include a method of providing heat with a heater or the like to a side opposite of the recording medium at which the treatment liquid has been applied on, a method of blowing warm air or hot air to the side of the recording medium at which the treatment liquid has been applied on, and a heating method using an infrared heater, and a combination of plural methods thereof may be used for heating.

[Treatment Liquid]

The treatment liquid is an aqueous composition which is capable of forming an aggregate when contacting an ink composition, and specifically the treatment liquid contains at least coagulation component which is capable of agglutinating dispersed particles such as a resin-coated quinacridone-type pigment in the ink composition to form an aggregate when mixed with the ink composition, and the treatment liquid may be configured to contain other components as needed.

When the treatment liquid is used together with the ink composition, higher speed of inkjet recording can be performed and an image with high image density and image resolution even when high speed recording is performed.

—Coagulation Component—

The treatment liquid contains at least one type of a coagulation component which is capable of forming an aggregate when contacting the ink composition. Coagulation of a resin-coated quinacridone-type pigment which is stably dispersed in the ink composition is promoted by mixing the treatment liquid with the ink composition ejected by the inkjet recording method.

Examples of the treatment liquid include a liquid composition which is capable of forming an aggregate by changing pH of an ink composition. A pH of the treatment liquid (25° C.) is preferably from 1 to 6, more preferably from 1.2 to 5, and further preferably from 1.5 to 4, from the viewpoint of the coagulation rate of the ink composition. In this case, a pH (25° C.) of the ink composition used in the ink ejection process is preferably from 7.5 to 9.5 (more preferably from 8.0 to 9.0).

Among them, in the present invention, a pH (25° C.) of the ink composition is 7.5 or more and a pH (25° C.) of the treatment liquid is preferably from 3 to 5 from the viewpoints of image density, resolution, and higher inkjet image formation.

The coagulation component can be used alone or as a mixture of two or more types thereof.

The treatment liquid may be configured to include at least one type of acid compound as a coagulation component.

Examples of the acid compound that can be used include a compound having a phosphoric acid group, a phosphonic acid group, a phosphinic acid group, a sulfuric acid group, a sulfonic acid group, a sulfinic acid group or a carboxyl group or a salt thereof (for example, multivalent metal salts). Among them, a compound having a phosphoric acid group or a carboxyl acid group is preferred, and a compound having a carboxyl group is more preferred, from the viewpoint of the coagulation rate of the ink composition.

A compound having a carboxyl group is preferably selected from polyacrylic acid, acetic acid, glycolic acid, malonic acid, malic acid, maleic acid, ascorbic acid, succinic acid, glutaric acid, fumaric acid, citric acid, tartaric acid, lactic acid, pyrrolidonecarboxylic acid, pyronecarboxylic acid, pyrrolecarboxylic acid, furancarboxylic acid, pyridinecarboxylic acid, coumaric acid, thiophenecarboxylic acid, nicotinic acid, a derivative of these compounds, or a slat thereof (for example, multivalent metal salts). The compound may be used alone or in combination of two or more types thereof.

The treatment liquid may be configured to further contain an aqueous solvent (for example, water), in addition to the acidic compound.

When the treatment liquid contains an acidic compound, the content of the acidic compound in the treatment liquid is preferably from 5 to 95% by mass, and more preferably from 10 to 80% by mass, with respect to a total mass of the treatment liquid, from the viewpoint of the coagulation effects.

Preferred examples of the treatment liquid that increases coagulation property at higher speed include a treatment liquid to which a multivalent metal salt or polyallylamine is added.

Examples of the multivalent metal salt or polyallylamine include salts of, alkaline earth metals in Group 2 (for example, magnesium and calcium) of the periodic table, transition metals in Group 3 (for example, lanthanum) of the periodic table, metals in Group 13 (for example, aluminum) of the periodic table, and lanthanides (for example, neodymium), polyallylamine, and polyallylamine derivatives. Preferable examples of the metal salt include a carboxylate salt (salts of, formic acid, acetic acid, and benzoic acid), a nitrate salt, a chloride, and a thiocyante salt are preferred. Among them, a calcium salt or a magnesium salt of a carboxylic acid (formic acid, acetic acid, and benzoic acid), a calcium salt or magnesium salt of nitric acid, calcium chloride, magnesium chloride, and a calcium salt or a magnesium salt of thiocyanic acid are preferred.

When the treatment liquid contains a multivalent metal salt, the content of a multivalent metal salt in the treatment liquid is preferably in a range of from 1 to 10% by mass, more preferably from 1.5 to 7% by mass, and further preferably from 2 to 6% by mass, with respect to a total mass of the treatment liquid.

Viscosity of the treatment liquid is preferably in a range of from 1 to 30 mPa·s, more preferably in a range of from 1 to 20 mPa·s, further preferably in a range of from 2 to 15 mPa·s, and particularly preferably in a range of from 2 to 10 mPa·s, from the view point of the coagulation rate of the ink composition. Viscosity is determined under the condition at 20° C. using a VISCOMETER TV-22 (manufactured by TOKI SANGYO Co., Ltd.).

Surface tension of the treatment liquid is preferably from 20 to 60 mN/m, more preferably from 20 to 45 mN/m, and further preferably from 25 to 40 mN/m, from the viewpoint of the coagulation rate of an ink composition. Surface tension is determined under the condition at 25° C. using an automatic surface tensiometer CBVP-Z (manufactured by Kyowa Interface Science Co., Ltd.).

<Heating and Fixing Process>

The image formation method of the present invention preferably includes a heating and fixing process in which a heated surface contacts an ink image that has been formed by applying the ink composition after the ink ejection process.

An image is fixed onto a recording medium by performing heating and fixing treatment to improve scratch resistance of the image.

A method of heating is not particularly limited, and preferable examples thereof include a non-contact drying method such as a heating method with a heating element such as a nichrome wire, a method of providing warm air or hot air, and a heating method with a halogen lamp and an infrared lamp. Further, a heating and pressing method is not particularly limited, and preferable examples thereof include a heating and fixing method through contact such as a method of pressing and pressuring a surface of a recording medium at which an image is formed with a hot plate; and a method of using a heating and pressing device equipped with: a pair of a heating and pressing rollers; a pair of heating and pressing belt; or a heating and pressing belt which is placed facing a side of the recording medium at which the image is recorded and a retention roller which is placed opposite thereto, to pass through the pair of rollers or the like.

A conveyance speed of the recording medium when a heating and pressing roll or a heating and pressing belt is used is preferably in a range of from 200 mm/sec to 700 mm/sec, more preferably from 300 mm to 650 mm/sec, and further preferably from 400 mm/sec to 600 mm/sec.

<Other Process>

The image formation method of the present invention may include other process such as a drying process and a curing process as needed.

(Curing Process)

When the ink composition further contains a polymerizable compound, the image formation method of the present invention may further include a curing process, in which an image formed in the ink ejection process is irradiated with an active radiation ray to cure the image.

By this process, rubbing resistance of the image formed and adhesion between the image and a recoding medium is improved.

An active energy ray is not particularly limited so far as a polymerizable compound can be polymerized. Examples of the active energy ray include ultraviolet light and electron beam, and among them, ultraviolet light is preferred from the viewpoint of application versatility. Further, examples of a source for generating an active energy ray include an ultraviolet lamp (halogen lamp and high-pressure mercury lamp), a laser, a light emitting diode (LED), and an electron beam irradiation apparatus.

The ultraviolet intensity is preferably in a range of from 500 to 5,000 mW/cm$^2$ in a wavelength region that is effective for curing.

As a part of irradiation of ultraviolet light, a common irradiation part may be used, and an ultraviolet lamp is particularly preferred. Preferred examples of the ultraviolet lamp include a so-called low pressure mercury lamp in which a vapor pressure of mercury is from 1 to 10 Pa when illuminated; a high pressure mercury lamp; a mercury lamp coated with a fluorescent, and an UV-LED light source. Emission spectrum in a ultraviolet light region of the mercury lamp and the UV-LED is 450 nm or lower, particularly in a region of from 184 nm to 450 nm, which is suitable for effectively reacting a black or colored polymerizable compound in an ink composition. The mercury lamp and the UV-LED are suitable in terms of capable of using a small power source when a power source is mounted on a printer. As a mercury lamp, for example, a metal halide lamp, a high pressure mercury lamp, an ultra-high pressure mercury lamp, a xenon flash lamp, a deep UV lamp, a lamp in which a mercury lamp is excited externally using microwave without an electrode, and a UV laser are in practically use. These lamps emit light that is in the above range as an emission wavelength region, and therefore, is principally applicable so far as the size of a power source, the input intensity, a lamp shape, and the like are acceptable. The light source is also selected depending on the sensitivity of the polymerization initiator to be used.

EXAMPLES

Hereinafter, the present invention is specifically described with Examples, but these Examples are in no way to intend limiting the present invention. "Parts" and "%" are based on mass unless otherwise noted.

The weight average molecular weight was determined by gel permeation chromatography (GPC). An HLC-8020 GPC (manufactured by TOSOH CORPORATION) was used for GPC, three TSK gel SuperMultipore HZ-H columns (4.6 mm I.D.×15 cm, manufactured by TOSOH CORPORATION) were used as the column, and tetrahydrofuran (THF) was used as an eluent. The measurement was performed using a refractive index detector (differential refractive index detector) under the condition in which the sample concentration was 0.35% by mass, the flow rate was 0.35 mL/min, the sample injection volume was 10 and the measurement temperature was 40° C. The calibration curve was obtained using 8 samples of a TOSOH TSK polystyrene calibration standards, "F-40", "F20", "F-4", "F-1", "A-5000", "A-2500", "A-1000", and "n-propylbenzene".

<Synthesis of Water-Insoluble Resin (Polymer Dispersing Agent) P-1>

To a 1,000 mL three-neck flask equipped with a stirrer and a cooling tube was added 88 g of methyl ethyl ketone to heat under a nitrogen atmosphere to 72° C., to which a solution of dissolving 0.85 g of dimethyl 2,2'-azobis(isobutyrate), 50 g of phenoxyethyl methacrylate, 13 g of methacrylic acid, and 37 g of methyl methacrylate in 50 g of methyl ethyl ketone was added dropwise over 3 hours. After completing a dropwise addition and further reacting the mixture for 1 hour, a solution of dissolving 0.42 g of dimethyl 2,2'-azobis(isobutyrate) in 2 g of methyl ethyl ketone was added to the mixture, which was then heated to 78° C. to continue heating for 4 hours. The reaction mixture obtained was re-precipitated twice with an excess amount of hexane followed by collecting and drying a resin precipitated to obtain 96.5 g of a copolymer of phenoxyethyl methacrylate, methyl methacrylate, and methacrylic acid (copolymerization ratio (ratio in % by mass)=50:37:13) (Water-insoluble Resin P-1).

The composition of the water-insoluble resin obtained was confirmed by $^1$H-NMR, and the weight average molecular weight (Mw) determined by GPC was 49,400. The acid value determined by the method according to JIS standard (JIS K0070:1992) was found to be 84.8 mg KOH/g.

<<Synthesis of Resin Dispersing Agent P-2>>

A resin dispersing agent P-2 was synthesized as follows.

Methacrylic acid (172 parts), benzyl methacrylate (828 parts), and isopropanol (375 parts) were mixed to prepare a monomer feed composition.

2,2-azobis(2-methylbutyronitrile) (22.05 parts) and isopropanol (187.5 parts) were mixed to prepare an initiator feed composition.

Then, to isopropanol (187.5 parts) heated at 80° C. under a nitrogen atmosphere was added dropwise a mixture of the monomer feed composition and the initiator feed composition over 2 hours. After completing a dropwise addition and further keeping the mixture at 80° C. for 4 hours, the mixture was cooled to 25° C.

After cooling, the solvent was removed under reduced pressure to obtain Resin Dispersing Agent P-2 having a weight average molecular weight of approximately 50,000.

<Preparation of Specific Oxidative-Treated Pigment>

The following carbon black pigments were prepared as the specific oxidative-treated pigment. The average primary particle diameter (catalog value) of each pigment was shown in the column of "particle diameter (nm)" of "CB Pigment" in Table 1.

Special Black 6 (amount of oxygen on the surface: 11 atomic %, Orion Engineered Carbons, Ltd.)

Special Black 4 (amount of oxygen on the surface: 6 atomic %, Orion Engineered Carbons, Ltd.)

Colour Black FW200 (amount of oxygen on the surface: 12 atomic %, Orion Engineered Carbons, Ltd.)

Fuji Jet Black (amount of oxygen on the surface: 12 atomic %: manufactured by Fuji Pigment Co., Ltd.)

Colour Black FW182 (amount of oxygen on the surface: 12 atomic %, Orion Engineered Carbons, Ltd.)

Nipex 160 (amount of oxygen on the surface: 2 atomic %, Orion Engineered Carbons, Ltd.)

An oxidative-treated product of Nipex 160 (amount of oxygen on the surface: 2 atomic %, Orion Engineered Carbons, Ltd.)

Nipex 170 (amount of oxygen on the surface: 3 atomic %, Orion Engineered Carbons, Ltd.)

The oxidative-treated product of Nipex 160 is an oxidized pigment obtained by oxidative-treating Nipex 160 with sodium hypochlorite.

Also, the amount of oxygen on the surface of carbon black pigment was quantitatively-determined as follows.

<Quantitative Determination of Amount of Oxygen on Surface of Carbon Black Pigment>

Firstly a pigment dispersion prepared by the method described below was diluted with acetone to ten-fold. The diluted solution obtained was centrifuged with a centrifuge machine of Beckman under the condition of 80,000 rpm for 30 minutes. The supernatant of the diluted solution in which a solid content was precipitated was discarded to collect the precipitate. The process including that "the precipitate obtained by centrifugal separation is collected and diluted with acetone, and centrifugal separation of the diluted solution is repeated under the same condition" was repeated three times.

Then, the precipitate was collected to confirm that there is no absorption peak derived from the polymeric dispersing agent in infrared absorption spectra (infrared absorption spectrometry).

Next, the precipitate was dried and placed on an indium plate, and then pressed and fixed using a tablet forming machine for IR measurement to form into a tablet-shape. ESCA measurement of the formed tablet was performed using an AXIS-HSi manufactured by Shimadzu Corporation. In ESCA measurement, a monochromatic X-ray gun in which an anode is made of Al was used and the lens mode was set to "Hybrid". Further, a neutralization gun was used.

The term "an amount of oxygen of 5 atomic % or more on the surface" means that a ratio (ratio of the number of atoms: $O/C \times 100\%$) of the number of oxygen atoms (O) to the number of carbon atoms (C), present on a surface (including an interior portion of from 3 to 5 nm in the depth direction) of particles of a carbon black pigment is 5 atomic % or more. In the present invention, the amount of oxygen on a surface of a carbon black pigment was calculated based on carbon atoms in ESCA measurement.

<Preparation of Ink Composition>

Ink Compositions 1 to 19 as a black color ink composition were prepared as the ink composition to be used for an image formation.

Hereinafter, the details are described.

(Preparation of Pigment Dispersion 1)

10.0 parts of a carbon black pigment (Special Black 6, Orion Engineered Carbons, Ltd.), 4.8 parts of the Polymer Dispersing Agent P-1, 18 parts of methyl ethyl ketone, 16.8 parts of a 1 mol/L NaOH aqueous solution, and 59.4 parts of ion-exchanged water were mixed and dispersed for 3 hours in a bead mill with zirconia beads of 0.1 mmϕ.

From the dispersion obtained, methyl ethyl ketone was removed at 55° C. under the reduced pressure and a part of water was further removed. Subsequently, centrifugal treatment was performed at 8,000 rpm for 30 minutes using a high speed refrigerated centrifuge 7550 (manufactured by Kubota Corporation) with a 50 mL centrifuge tube to collect the supernatant liquid other than the precipitate. Then, the pigment concentration was determined from the absorption spectra, and Pigment Dispersion 1 as a dispersion of resin-coated pigment particles (encapsulated pigment) in which the carbon black concentration was 12.0% by mass was obtained.

The volume average particle diameter was determined by the dynamic light scattering method using a NANOTRACK UPA-EX150 particle size distribution analyzer (manufactured by NIKKISO Co., Ltd.), and found to be 92 nm.

(Preparation of Pigment Dispersions 2 to 6 and Pigment Dispersions 8 to 10)

Pigment Dispersions 2 to 6 and Pigment Dispersions 8 to 10 were prepared in a similar manner as in the preparation of the Pigment Dispersion 1, except that the carbon black pigment (Special Black 6 (Orion Engineered Carbons Ltd.)) was changed to carbon black pigments shown in the "CB pigment" column in Table 1.

Fuji Jet Black was used as it is as the pigment dispersion 3 since Fuji Jet Black is a pigment dispersion liquid having a pigment concentration of 15% by mass (Preparation of Pigment Dispersion 7)

An amount equivalent to 0.8 of the amount of the methacrylic acid in the resin dispersing agent P-2 (150 parts) obtained was neutralized using an aqueous solution of potassium hydroxide. Further, ion-exchanged water was added thereto such that the concentration of the resin dispersing agent in the aqueous solution was 20% by mass, thereby preparing an aqueous solution of the resin-dispersing agent.

The aqueous solution of the resin dispersing agent (135 parts), a carbon black pigment (Colour Black FW182, manufactured by Orion Engineered Carbons, Ltd.) (60 parts), ion-exchanged water (204.5 parts), and a 1 mol/L KOH aqueous solution (100.5 parts) were mixed and dispersed in a bead mill (0.1 mmϕ zirconia beads) until a desired volume average particle diameter was obtained, to obtain a dispersion N1 (non-crosslinked dispersion) of resin-coated black pigment particles in which the concentration of the pigment was 12%.

To the obtained dispersion N1 (208 parts) were added ion-exchanged water (42 parts), Denacol EX-321 (1.1 parts), and an aqueous solution of boric acid (12.2 parts, 4% aqueous solution of boric acid), and the mixture was reacted for 5.5 hours at 50° C. and then cooled to 25° C. Ion-exchanged water was added to the obtained cross-linked dispersion, and ultrafiltration was performed using a stirring type Ultraholder (manufactured by ADVANTEC MFG, Inc.) and an ultrafiltration filter Q0500076E Ultrafilter (molecular weight cut off: 50,000, (manufactured by ADVANTEC MFG, Inc.)). After the purification of the cross-linked dispersion was performed by ultrafiltration such that the concentration of dipropylene glycol in the dispersion was 1% or less with respect to the total amount of the pigment, the dispersion was concentrated to have a pigment concentration of 12% by mass to obtain Pigment Dispersion 7.

0.1 parts of the Pigment Dispersion 7 obtained was mixed with 19.9 parts of ion-exchanged water to prepare a mixture. The volume average particle diameter of secondary particles of the carbon black pigment was determined using the obtained mixture by a NANOTRACK UPA-EX150 particle size distribution analyzer (manufactured by NIKKISO Co., Ltd.), and found to be 95 nm.

<Synthesis of Polymerizable Compound 2>

To a 1 L three-neck flask equipped with a stirrer were charged 40.0 g (182 mmol) of 4,7,10-trioxa-1,13-tridecanediamine, 37.8 g (450 mmol) of sodium hydrogen carbonate, 100 g of water, and 300 g of tetrahydrofuran, and thereto, 35.2 g (389 mmol) of acryloyl chloride was added dropwise over 20 minutes while cooling in an ice bath. After completing a dropwise addition, stirring the mixture for 5 hours at ambient temperature, and then tetrahydrofuran in the reaction mixture obtained was evaporated under reduced pressure. Subsequently, an aqueous phase was extracted four times with 200 mL of ethyl acetate, and the obtained organic layer was dried with magnesium sulfate. Then, filtration and evaporation of the solvent under reduced pressure were performed to obtain 35.0 g (107 mmol, yield: 59%) of a solid of intended Polymerizable Compound 2.

Polymerizable compound 2

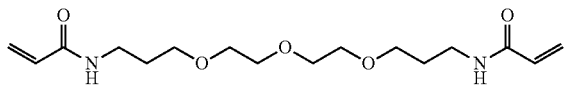

(Preparation of Black Ink Composition 1)

Using Pigment Dispersion 1, Polymerizable Compound 2, and colloidal silica (SNOWTEX XS, average particle diameter: 5 nm, manufactured by NISSAN CHEMICAL INDUSTRIES, Ltd.), each component was mixed so as to have the following ink composition. A plastic disposable syringe was filled with the mixture, and filtration was performed with a 5 μm PVDF filter (Millex-SV, diameter: 25 mm, manufactured by EMD Millipore Corporation) to prepare the black ink composition 1.

| -Ink Composition- | |
|---|---|
| Pigment Dispersion 1 | 15.8% |
| Polymerizable Compound 2 (Polymerizable compound) | 18% |
| EQUAMIDE B100 (water-soluble organic solvent) (Amide type organic solvent) (manufactured by Idemitsu Kosan Co., Ltd.) | 5.2% |
| Colloidal silica (solid content) (SNOWTEX SX, solid content concentration: 20%, manufactured by NISSAN CHEMICAL INDUSTRIES., Ltd.) | 0.05% |
| OLFINE E1010 (specific compound) (manufactured by Nisshin Chemical Industry Co., Ltd.) | 1% |
| IRGACURE 2959 (polymerization initiator) (manufactured by BASF Japan Ltd.) | 2.7% |
| Ion-exchanged water | Balance to have a total amount of 100% by mass |

(Preparation of Black Ink Compositions 2 to 19)

Black Ink Compositions 2 to 19 were prepared in a similar manner as in the preparation of Black Ink Composition 1, except that Pigment Dispersion 1 was changed to the pigment dispersions shown in "type of pigment dispersion" in Table 1 and OLFINE E1010 was changed to the compounds shown in "type of nonionic compounds" in Table 1.

A nonionic compound used in preparation of Ink Compositions 12 and 14 was OLFINE E1020 from Nisshin Chemical Co., Ltd. and a nonionic compound used in preparation of Ink Composition 19 was "PEG 1540" from SANYOKASEI Co., Ltd.

In preparation of Black Ink Composition 3, Fuji Jet Black was used as it is, and Fuji Jet Black was mixed such that the solid content of Fuji Jet Black in Black Ink Composition 3 is 1.9%.

The value shown as "addition amount" in the "CB pigment" column is a solid content with respect to the total mass of an ink composition. For example, Ink Composition 1 contains 1.90% of Special Black 6 in a solid content with respect to the total mass of ink composition 1.

<Image Formation>

(Preparation of Treatment Liquid 1)

Components having the following composition were mixed to prepare Treatment Liquid 1. Viscosity, surface tension and pH (25° C.) of Treatment Liquid 1 were found to be 2.5 mPa·s, 40 mN/m, and a pH of 1.0, respectively. Surface tension was measured with an automatic surface tensiometer CBVP-Z manufactured by Kyowa Interface Science Co., Ltd. and viscosity was measured with a rheometer DV-III Ultra CP manufactured by Brookfield Engineering Laboratories. pH was measured with a pH meter HM-30R manufactured by DKK-TOA CORPORATION.

Components having the following compositions for Cleaning Solution 1 were mixed to prepare Cleaning Solution 1.

| -Composition of Treatment liquid 1- | |
|---|---|
| Malonic acid (manufactured by Wako Pure Chemical Industries, Ltd.) | 25.0% |
| Diethylene glycol monomethyl ether (manufactured by Wako Pure Chemical Industries, Ltd.) | 20.0% |
| EMULGEN P109 (nonionic surfactant, manufactured by Kao Corporation) | 1.0% |
| Ion-exchanged water | 54.0% |
| -Composition of Cleaning Solution 1- | |
| Diethylene glycol monobutyl ether | 20.0% |
| Diethylene glycol | 10.0% |
| Ion-exchanged water | 70.0% |

An inkjet head equipped with a silicon nozzle plate was prepared and an storage tank connected to the inkjet head was filled with obtained Black Ink Compositions 1 to 19. The silicon nozzle plate was provided in advance with a liquid-repellent film using a fluorinated alkylsilane compound (heptadecafluoro-1,1,2,2-tetrahydrodecyl)trichlorosilane). As a recording medium, a sheet of "OK TOPKOTE+" (basis weight: 104.7 g/m$^2$) manufactured by Oji Paper Co., Ltd. was cut into A5 size, and was fixed on a stage that was movable in a predetermined linear direction at 500 mm/sec while maintaining the temperature of stage at 30° C. Treatment Liquid 1 obtained as described above was applied to the recording medium using a bar coater such that a coating thickness was approximately 1.2 μm, and dried at 50° C. for 2 seconds immediately after coating.

Thereafter, a solid image was printed as follows. The inkjet head was fixed and arrayed such that the direction of the line head where nozzles were arrayed (main scanning direction) was inclined at an angle of 75.7 degrees with respect to the direction perpendicular to the moving direction of the stage (subscanning direction). While moving the recording medium at a constant speed along the subscanning direction, the ink was ejected onto the entire surface of the recording medium by a line system under ejection conditions of an ink droplet amount of 2.8 pL, an ejection frequency of 25.5 kHz, and a resolution of 1,200 dots per inch (dpi)×1,200 dpi. After the image recording was completed, the recording medium onto which the ink composition had been applied was dried by applying a flow of hot air at a temperature of 120° C. and at a rate of 5 msec to the surface onto which the ink was ejected for 15 seconds using a blower, while heating with an infrared heater from a side of the recording medium opposite to the surface onto which the ink was ejected (rear surface). After drying, the image was irradiated with UV light (using metal halide lamp manufactured by EYE GRAPHICS Co., Ltd., maximum irradiation wavelength: 365 nm) such that the total irradiation level was 3 J/cm$^2$, to cure the image. In this way, a print image sample was obtained.

In Examples 2 and 6, a silicon nozzle plate used was the silicon nozzle plate having a liquid-repellent film provided using an oxygen-containing fluorinated alkylsilane compound (SIFEL KY-100 manufactured by Shin-Etsu Chemical Co., Ltd.).

<Evaluation>

The following evaluation for the ink composition obtained was performed. The results of evaluation are shown in Table 1.

[Maintenance Suitability]

A rubber roller having a rotation mechanism of φ40 mm was wrapped with a wiping cloth (TORAYSEE manufactured by Toray Industries, Inc.) for evaluating maintenance suitability, and a contact pressure with a test piece of the liquid-repellent film was adjusted such that the contact pressure was 40 kPa. The test piece of the liquid-repellent film was rubbed with a cloth soaked with a solution obtained by diluting each of the ink compositions 1 to 19 with Cleaning Solution 1 (97.0% of the cleaning solution and 3% of the ink composition), and a contact angle of the liquid-repellent film after rubbing was measured 4 times to calculate an average value of the four measurements. The maintenance frequency in which the contact angle is below 60 degrees (the rotation frequency of the roller) was denoted as the longevity of the liquid-repellent film. Deterioration-prevention property of the liquid-repellent film with respect to each ink composition was evaluated in accordance with the rotation frequency of the roller as the maintenance frequency in which the contact angle is below 60 degrees.

The case in which the rotation frequency of the roller is below 80 revolutions is a practically problematic level.

<Blocking Resistance>

Two pieces of an evaluation sample were prepared as follows. One piece having a size of 4 cm×4 cm was cut out from the print image sample obtained as described in the image formation. Then, the two pieces of the evaluation sample were stacked to each other such that the printed faces of each evaluation sample on which the solid image was printed were in contact with each other. Further, the two pieces of the stacked evaluation samples were pressed at pressure of 1.0 MPa for 10 seconds using a press.

Thereafter, the two pieces of the evaluation samples were peeled off to determine the ease of peeling off and a level of damage of the image after peeling off was visually observed and evaluated in accordance with the following evaluation criteria.

Evaluation of blocking resistance was performed under the condition in which the temperature of the solid image at pressing was 25° C.

—Evaluation Criteria for Blocking Resistance—

A: The stacked pieces peeled off easily without tacky feeling when the two pieces of the evaluation sample were peeled off, and color migration between the two pieces of the evaluation sample was not observed.

B: There was slight tacky feeling when the two pieces of the evaluation sample were peeled off, but no damage on the image was observed.

C: There was tacky feeling when the two pieces of the evaluation sample were peeled off, and slight damage on the image was observed.

D: There was strong tacky feeling when the two pieces of the evaluation sample were peeled off, and damage on the image was significant, which was a practically problematic level. (However, note that the case corresponding to the level "E" in the following was excluded.)

E: There was very strong tacky feeling when the two pieces of the evaluation sample were peeled off, and the image and the coat layer were damaged, which was the level inferior to the level "D".

In the evaluation criteria for blocking resistance, the level "D" or lower (namely, the level "D" and the level "E") is practically problematic.

TABLE 1

| | | Example | | | | | | | | | |
|---|---|---|---|---|---|---|---|---|---|---|---|
| | | 1 | 2 | 3 | 4 | 5 | 6 | 7 | 8 | 9 | 10 |
| Ink Composition Pigment Dispersion | | 1 1 | 2 2 | 3 3 | 4 4 | 5 5 | 6 5 | 7 6 | 8 5 | 9 5 | 10 7 |
| CB pigment | Type | Special Black 6 | Colour Black FW200 | Fuji Jet Black | Oxidative-treated Nipex 160 | Colour Black FW182 | Colour Black FW182 | Colour Black FW182 | Colour Black FW182 | Colour Black FW182 | Colour Black FW182 |
| | Particle diameter (nm) | 17 | 13 | 17 | 20 | 14 | 14 | 14 | 14 | 14 | 14 |
| | Addition amount | 1.90% | 1.90% | 1.90% | 1.90% | 1.90% | 1.90% | 2.10% | 1.90% | 1.90% | 1.90% |
| | Amount of Oxygen | 11 atomic % | 12 atomic % | 12 atomic % | 8 atomic % | 12 atomic % | 12 atomic % | 12 atomic % | 12 atomic % | 12 atomic % | 12 atomic % |
| Nonionic compound | Type | OLFINE E1010 | OLFINE E1010 | OLFINE E1010 | OLFINE E1010 | PEG (6.5) monodecyl ether | PEG (6.5) monodecyl ether | PEG (6.5) monodecyl ether | PEG (6.5) monodecyl ether | OLFINE E1010 | OLFINE E1010 |
| | Total of EO/PO | 10 | 10 | 10 | 10 | 6.5 | 6.5 | 6.5 | 6.5 | 10 | 10 |
| | Addition amount | 1% | 1% | 1% | 1% | 1% | 1% | 1% | 1.5% | 1% | 1% |
| Formulation of cleaning solution | | Cleaning Solution 1 | Cleaning Solution 1 | Cleaning Solution 1 | Cleaning Solution 1 | Cleaning Solution 1 | Cleaning Solution 1 | Cleaning Solution 1 | Cleaning Solution 1 | Cleaning Solution 1 | Cleaning solution 1 |
| Liquid-repellent film | | Fluorinated alkyl | Oxygen-containing fluorinated alkyl | Fluorinated alkyl | Fluorinated alkyl | Fluorinated alkyl | Oxygen-containing fluorinated alkyl | Fluorinated alkyl | Fluorinated alkyl | Fluorinated alkyl | Fluorinated alkyl |
| Evaluation | Maintenance suitability | 88 revolutions | 400 revolutions | 350 revolutions | 88 revolutions | 330 revolutions | 420 revolutions | 280 revolutions | 370 revolutions | 280 revolutions | 320 revolutions |
| | Blocking resistance | A | B | A | B | A | A | A | B | A | A |

| | | Example | | | | | Comparative Example | | | |
|---|---|---|---|---|---|---|---|---|---|---|
| | | 11 | 12 | 13 | 14 | 15 | 1 | 2 | 3 | 4 |
| Ink Composition Pigment Dispersion | | 11 8 | 12 1 | 13 1 | 14 7 | 15 7 | 16 9 | 17 10 | 18 1 | 19 1 |
| CB pigment | Type | Special Black 4 | Special Black 6 | Special Black 6 | Colour Black FW182 | Colour Black FW182 | Nipex 160 | Nipex 170 | Special Black 6 | Special Black 6 |
| | Particle diameter (nm) | 25 | 17 | 17 | 14 | 14 | 20 | 17 | 17 | 17 |
| | Addition amount | 1.90% | 1.90% | 1.90% | 1.90% | 1.90% | 1.90% | 1.90% | 1.90% | 1.90% |
| | Amount of Oxygen | 6 atomic % | 11 atomic % | 11 atomic % | 12 atomic % | 12 atomic % | 2 atomic % | 3 atomic % | 11 atomic % | 11 atomic % |
| Nonionic compound | Type | OLFINE E1010 | OLFINE E1020 | Triethylene glycol monobutyl ether | OLFINE E1020 | Triethylene glycol monobutyl ether | OLFINE E1010 | OLFINE E1010 | Diethylene glycol | PEG-1540 |
| | Total of EO/PO | 10 | 20 | 3 | 20 | 3 | 10 | 10 | 2 | 32 |
| | Addition amount | 1% | 1% | 1% | 1% | 1% | 1% | 1% | 1% | 1% |
| Formulation of cleaning solution | | Cleaning Solution 1 | Cleaning Solution 1 | Cleaning Solution 1 | Cleaning Solution 1 | Cleaning Solution 1 | Cleaning Solution 1 | Cleaning Solution 1 | Cleaning Solution 1 | Cleaning Solution 1 |
| Liquid-repellent film | | Fluorinated alkyl | Fluorinated alkyl | Fluorinated alkyl | Fluorinated alkyl | Fluorinated alkyl | Fluorinated alkyl | Fluorinated alkyl | Fluorinated alkyl | Fluorinated alkyl |

TABLE 1-continued

| Evaluation | | 80 revolutions | 82 revolutions | 88 revolutions | 240 revolutions | 300 revolutions | 36 revolutions | 44 revolutions | 66 revolutions | 66 revolutions |
|---|---|---|---|---|---|---|---|---|---|---|
| Maintenance Suitability Blocking resistance | | B | B | B | A | A | C | C | C | C |

As shown in Table 1, the ink compositions of Examples in which both a specific oxidative-treated pigment and a specific compound are used were excellent in preventing a liquid-repellent film from deterioration. Further, as understood from the evaluation results of Examples 9 and 10, even when the same specific oxidative-treated pigment was used, Ink Composition 10 (Example 10) which contains Pigment Dispersion 7 manufactured by the method including a cross-linking process had a greater rotation frequency of the roller in which the contact angle was below 60 degrees, than Ink Composition 9. It is considered from these results that when a pigment dispersion is in a form of a cross-linked dispersion, abrasive deterioration of the liquid-repellent film is likely to be suppressed.

An image with a high resolution was formed in each of the print image samples obtained using the ink composition of Examples. It is considered that, as illustrated in Table 1, since the liquid-repellent film is less likely to be deteriorated by the ink compositions of Examples, ejection of the ink composition from the nozzle plate is stable.

According to the present invention, an image formation method in which deterioration of a liquid-repellent film provided on a surface of an inkjet head is prevented can be provided.

Embodiments of the present invention include, but are not limited to, the following.

<1> An image formation method comprising an ink ejection process of ejecting, from an inkjet head having a liquid-repellent film on an ejection surface thereof, an ink composition including: an oxidative-treated carbon black pigment having an average primary particle diameter of 25 nm or less and having an amount of oxygen of 5 atomic % or more on a surface thereof; a water-soluble nonionic compound including at least one selected from the group consisting of an ethyleneoxy chain and a propyleneoxy chain and in which a total number of the ethyleneoxy chain and the propyleneoxy chain is from 3 to 25; and water.

<2> The image formation method according to <1>, wherein the ink composition further includes a polymerizable compound.

<3> The image formation method according to <1> or <2>, wherein the inkjet head is provided with a nozzle plate at which a plurality of ejection holes are two-dimensionally arrayed and the liquid-repellent film is formed on an ejection surface of the nozzle plate.

<4> The image formation method according to any one of <1> to <3>, wherein the liquid-repellent film contains at least a fluorocarbon compound.

<5> The image formation method according to <4>, wherein the fluorocarbon compound contains an oxygen atom.

<6> The image formation method according to <2>, wherein the inkjet head is provided with a nozzle plate at which a plurality of ejection holes are two-dimensionally arrayed and the liquid-repellent film is formed on an ejection surface of the nozzle plate.

<7> The image formation method according to <2>, wherein the inkjet head is provided with a nozzle plate at which a plurality of ejection holes are two-dimensionally arrayed and the liquid-repellent film is formed on an ejection surface of the nozzle plate, and the liquid-repellent film contains at least a fluorocarbon compound.

<8> The image formation method according to <2>, wherein the inkjet head is provided with a nozzle plate at which a plurality of ejection holes are two-dimensionally arrayed and the liquid-repellent film is formed on an ejection surface of the nozzle plate, the liquid-repellent film contains at least a fluorocarbon compound, and the fluorocarbon compound contains an oxygen atom.

<9> The image formation method according to any one of <1> to <8>, further comprising a maintenance process of removing the ink composition, or an ink deposit derived from the ink composition, that is adhered to the liquid-repellent film, after the ejecting of the ink composition.

All publications, patent applications, and technical standards mentioned in this specification are herein incorporated by reference to the same extent as if each individual publication, patent application, or technical standard was specifically and individually indicated to be incorporated by reference.

What is claimed is:

1. An image formation method comprising an ink ejection process of ejecting, from an inkjet head having a liquid-repellent film on an ejection surface thereof, an ink composition including: an oxidative-treated carbon black pigment having an average primary particle diameter of 25 nm or less and having an amount of oxygen of 5 atomic % or more on a surface thereof; a water-soluble nonionic compound including at least one selected from the group consisting of an ethyleneoxy chain and a propyleneoxy chain and in which a total number of the ethyleneoxy chain and the propyleneoxy chain is from 3 to 25; and water.

2. The image formation method according to claim 1, wherein the ink composition further includes a polymerizable compound.

3. The image formation method according to claim 2, wherein the inkjet head is provided with a nozzle plate at which a plurality of ejection holes are two-dimensionally arrayed and the liquid-repellent film is formed on an ejection surface of the nozzle plate.

4. The image formation method according to claim 2, wherein the inkjet head is provided with a nozzle plate at which a plurality of ejection holes are two-dimensionally arrayed and the liquid-repellent film is formed on an ejection surface of the nozzle plate, and the liquid-repellent film contains at least a fluorocarbon compound.

5. The image formation method according to claim 2, wherein the inkjet head is provided with a nozzle plate at which a plurality of ejection holes are two-dimensionally arrayed and the liquid-repellent film is formed on an ejection surface of the nozzle plate, the liquid-repellent film contains at least a fluorocarbon compound, and the fluorocarbon compound contains an oxygen atom.

6. The image formation method according to claim 1, wherein the inkjet head is provided with a nozzle plate at which a plurality of ejection holes are two-dimensionally arrayed and the liquid-repellent film is formed on an ejection surface of the nozzle plate.

7. The image formation method according to claim 1, wherein the liquid-repellent film contains at least a fluorocarbon compound.

8. The image formation method according to claim 7, wherein the fluorocarbon compound contains an oxygen atom.

9. The image formation method according to claim 1, further comprising a maintenance process of removing the ink composition, or an ink deposit derived from the ink composition, that is adhered to the liquid-repellent film, after the ejecting of the ink composition.

* * * * *